(12) United States Patent
Dhawan et al.

(10) Patent No.: US 11,926,543 B2
(45) Date of Patent: Mar. 12, 2024

(54) USE OF MULTIPLE CHARGED IONIC COMPOUNDS DERIVED FROM POLYAMINES FOR WASTE WATER CLARIFICATION

(71) Applicant: ECOLAB USA INC., Saint Paul, MN (US)

(72) Inventors: Ashish Dhawan, Saint Paul, MN (US); Carter M. Silvernail, Saint Paul, MN (US); Aarthi Narayanan, St. Paul, MN (US); Jason Robert Burney, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 17/652,728

(22) Filed: Feb. 28, 2022

(65) Prior Publication Data

US 2022/0177334 A1  Jun. 9, 2022

Related U.S. Application Data

(62) Division of application No. 16/554,803, filed on Aug. 29, 2019, now Pat. No. 11,292,734.

(Continued)

(51) Int. Cl.
*C02F 1/52* (2023.01)
*C08G 73/02* (2006.01)
(Continued)

(52) U.S. Cl.
CPC ............ *C02F 1/5272* (2013.01); *C08G 73/02* (2013.01); *C08G 83/006* (2013.01); *C08G 85/004* (2013.01); *C02F 2305/00* (2013.01)

(58) Field of Classification Search
CPC .................................................... C02F 1/5272
See application file for complete search history.

(56) References Cited

U.S. PATENT DOCUMENTS

| 2,195,974 A | 4/1940 | Reppe et al. |
| 3,077,487 A | 2/1963 | Ramsey et al. |

(Continued)

FOREIGN PATENT DOCUMENTS

| CN | 1340031 A | 3/2002 |
| CN | 101972612 A | 2/2011 |

(Continued)

OTHER PUBLICATIONS

Poly Suga® Quat, Naturally-derived Conditioning Surfactants, Datasheet, Colonial Chemical, Inc., Mar. 2022, 4 pages.

(Continued)

*Primary Examiner* — Peter Keyworth
(74) *Attorney, Agent, or Firm* — McKee, Voorhees & Sease, PLC

(57) ABSTRACT

Disclosed herein are the water clarification compositions and method of using the disclosed water clarification compositions for clarifying a water system or waste water source. Specifically, the disclosed compositions comprise and methods use multiple charged cationic or anionic compounds that are derived from polyamines through an aza-Michael addition with an activated olefin having an ionic group. The disclosed water clarification methods or compositions are found to be more effective than those methods or compositions including commonly used single quaternary compounds for reducing turbidity in water systems or waste water sources.

19 Claims, 4 Drawing Sheets

Polyalkyleneamine

+

Cationic Monomer

Michael Addition ⟶

(I)

Related U.S. Application Data

(60) Provisional application No. 62/724,360, filed on Aug. 29, 2018.

(51) Int. Cl.
  *C08G 83/00* (2006.01)
  *C08G 85/00* (2006.01)

(56) References Cited

U.S. PATENT DOCUMENTS

| | | |
|---|---|---|
| 3,793,194 A | 2/1974 | Zecher |
| 3,794,586 A | 2/1974 | Kimura et al. |
| 4,166,894 A | 9/1979 | Schaper |
| 4,246,030 A | 1/1981 | Lipinski |
| 4,259,217 A | 3/1981 | Murphy |
| 4,355,071 A | 10/1982 | Chang |
| 4,650,000 A | 3/1987 | Andreasson et al. |
| 4,692,315 A | 9/1987 | Greaves et al. |
| 4,705,665 A | 11/1987 | Malik |
| 4,784,797 A | 11/1988 | Treybig et al. |
| 4,798,675 A | 1/1989 | Lipinski et al. |
| 5,019,343 A | 5/1991 | Hwa et al. |
| 5,053,150 A | 10/1991 | Emert et al. |
| 5,192,798 A | 3/1993 | Aiken et al. |
| 5,399,746 A | 3/1995 | Steiger et al. |
| 5,614,616 A | 3/1997 | Buysch et al. |
| 5,670,464 A | 9/1997 | Kita et al. |
| 5,738,795 A | 4/1998 | Chen |
| 6,004,466 A | 12/1999 | Derian et al. |
| 6,054,054 A | 4/2000 | Robertson et al. |
| 6,080,323 A | 6/2000 | Yu et al. |
| 6,090,754 A | 7/2000 | Chan et al. |
| 6,217,778 B1 | 4/2001 | Shing et al. |
| 6,238,621 B1 | 5/2001 | Kalota et al. |
| 6,398,967 B2 | 6/2002 | Sparapany et al. |
| 6,503,880 B1 | 1/2003 | Skold et al. |
| 6,627,612 B1 | 9/2003 | O'Lenick, Jr. et al. |
| 6,797,785 B1 | 9/2004 | Hund et al. |
| 6,881,710 B1 | 4/2005 | O'Lenick, Jr. et al. |
| 6,984,340 B1 | 1/2006 | Brady et al. |
| 7,052,614 B2 | 5/2006 | Barak |
| 7,084,129 B1 | 8/2006 | Smith et al. |
| 7,345,015 B1 | 3/2008 | Kong et al. |
| 7,375,064 B1 | 5/2008 | O'Lenick, Jr. |
| 7,507,399 B1 | 3/2009 | O'Lenick, Jr. |
| 7,604,978 B2 | 10/2009 | Eldridge |
| 7,998,351 B2 | 8/2011 | Rai et al. |
| 8,324,264 B1 | 12/2012 | Eldridge et al. |
| 8,697,615 B2 | 4/2014 | Tekavee et al. |
| 8,858,803 B2 | 10/2014 | Guliashvili et al. |
| 8,933,055 B2 | 1/2015 | Pedersen et al. |
| 9,758,395 B2 | 9/2017 | Sikes |
| 9,956,153 B2 | 5/2018 | Emiru et al. |
| 10,850,999 B2 | 12/2020 | DiMascio et al. |
| 10,945,431 B2 | 3/2021 | Karandikar et al. |
| 11,058,111 B2 | 7/2021 | Dhawan et al. |
| 11,084,974 B2 | 8/2021 | Dhawan et al. |
| 11,236,040 B2 | 2/2022 | Dhawan et al. |
| 11,261,113 B2 | 3/2022 | Dhawan et al. |
| 11,292,734 B2 | 4/2022 | Dhawan et al. |
| 2001/0044393 A1 | 11/2001 | Peterson, Jr. et al. |
| 2001/0052501 A1 | 12/2001 | Sparapany et al. |
| 2002/0104349 A1 | 8/2002 | Richter et al. |
| 2002/0155978 A1 | 10/2002 | Man et al. |
| 2003/0121532 A1 | 7/2003 | Coughlin et al. |
| 2004/0009139 A1 | 1/2004 | Oldenhove |
| 2005/0061197 A1 | 3/2005 | Nalepa |
| 2005/0215461 A1 | 9/2005 | Gluck et al. |
| 2005/0261484 A1 | 11/2005 | Pascaly et al. |
| 2006/0008496 A1 | 1/2006 | Kulkarni et al. |
| 2006/0231505 A1 | 10/2006 | Mayer et al. |
| 2006/0289164 A1 | 12/2006 | Smith et al. |
| 2006/0289359 A1 | 12/2006 | Manek et al. |
| 2008/0152567 A1 | 6/2008 | Killough |
| 2009/0236571 A1 | 9/2009 | Cohen |
| 2010/0004316 A1 | 1/2010 | Lu et al. |
| 2010/0029530 A1 | 2/2010 | Whiteley |
| 2010/0305014 A1 | 12/2010 | Miralles et al. |
| 2011/0112007 A1 | 5/2011 | Hodge et al. |
| 2011/0296746 A1 | 12/2011 | Hernandez Altamirano et al. |
| 2012/0053111 A1 | 3/2012 | Hodge et al. |
| 2012/0070341 A1 | 3/2012 | Eder et al. |
| 2012/0115962 A1 | 5/2012 | Lee et al. |
| 2012/0258157 A1 | 10/2012 | Koltzenburg et al. |
| 2013/0266669 A1 | 10/2013 | Jiang et al. |
| 2014/0124454 A1 | 5/2014 | Nichols et al. |
| 2014/0224733 A1 | 8/2014 | Osness et al. |
| 2015/0203738 A1 | 7/2015 | Witham et al. |
| 2015/0272124 A1 | 10/2015 | Pedersen et al. |
| 2015/0290100 A1 | 10/2015 | Eder et al. |
| 2015/0336808 A1 | 11/2015 | Soane et al. |
| 2016/0010035 A1 | 1/2016 | Liu et al. |
| 2016/0030315 A1 | 2/2016 | Emiru et al. |
| 2016/0130494 A1 | 5/2016 | Zaid et al. |
| 2016/0145610 A1 | 5/2016 | Lu et al. |
| 2016/0208034 A1 | 7/2016 | Squicciarini |
| 2016/0215198 A1 | 7/2016 | Qu et al. |
| 2016/0262999 A1 | 9/2016 | Pedersen et al. |
| 2016/0264734 A1 | 9/2016 | Boday et al. |
| 2016/0264744 A1 | 9/2016 | Boday et al. |
| 2017/0029691 A1 | 2/2017 | Faust, Jr. et al. |
| 2017/0121560 A1 | 5/2017 | Dockery et al. |
| 2017/0130340 A1 | 5/2017 | Kalakodimi et al. |
| 2017/0233643 A1 | 8/2017 | Agashe et al. |
| 2017/0240815 A9 | 8/2017 | Balsamo De Hernandez et al. |
| 2017/0275536 A1 | 9/2017 | Jakubowski |
| 2017/0349543 A1 | 12/2017 | Siegwart et al. |
| 2017/0360040 A1 | 12/2017 | Kost et al. |
| 2018/0007895 A1 | 1/2018 | Karandikar et al. |
| 2018/0066211 A1 | 3/2018 | Pickering et al. |
| 2018/0105442 A1 | 4/2018 | Burney et al. |
| 2018/0105629 A1 | 4/2018 | Tada et al. |
| 2018/0118999 A1 | 5/2018 | Hikem et al. |
| 2018/0163020 A1 | 6/2018 | Zong et al. |
| 2018/0192643 A1 | 7/2018 | Fast et al. |
| 2019/0062187 A1 | 2/2019 | Dhawan et al. |
| 2019/0223434 A1 | 7/2019 | Balasubramanian et al. |
| 2019/0224627 A1 | 7/2019 | Glanz et al. |
| 2020/0071205 A1 | 3/2020 | Dhawan et al. |
| 2020/0071261 A1 | 3/2020 | Dhawan et al. |
| 2020/0071265 A1 | 3/2020 | Dhawan |
| 2020/0332423 A1 | 10/2020 | Dhawan et al. |

FOREIGN PATENT DOCUMENTS

| | | |
|---|---|---|
| CN | 102675535 A | 9/2012 |
| CN | 103118655 A | 5/2013 |
| CN | 103288672 A | 9/2013 |
| CN | 102675535 B | 11/2013 |
| CN | 104130335 A | 11/2014 |
| CN | 104130351 A | 11/2014 |
| CN | 104744709 A | 7/2015 |
| CN | 105076201 A | 11/2015 |
| CN | 105523956 A | 4/2016 |
| CN | 105884640 A | 8/2016 |
| CN | 106172434 A | 12/2016 |
| CN | 106423269 A | 2/2017 |
| CN | 106423284 A | 2/2017 |
| CN | 106634929 A | 5/2017 |
| CN | 106946743 A | 7/2017 |
| CN | 107440935 A | 12/2017 |
| CN | 108033895 A | 5/2018 |
| CN | 108048249 A | 5/2018 |
| CN | 108938662 A | 12/2018 |
| CN | 111315718 A | 6/2020 |
| EP | 0185970 A1 | 2/1985 |
| EP | 0296441 A2 | 12/1988 |
| EP | 1690960 A2 | 8/2006 |
| EP | 2333135 A2 | 6/2011 |
| GB | 847321 | 9/1960 |
| GB | 1550420 A | 8/1979 |
| JP | 57185322 A | 11/1982 |
| JP | 6259602 A | 3/1987 |
| JP | 6116898 A | 4/1994 |

(56) References Cited

FOREIGN PATENT DOCUMENTS

| | | | |
|---|---|---|---|
| JP | 913066 A | 1/1997 | |
| JP | 2001187751 A | 7/2001 | |
| JP | 200777082 A | 3/2007 | |
| JP | 2007054710 A | 3/2007 | |
| JP | 2007256445 A | 10/2007 | |
| JP | 2012136504 A | 7/2012 | |
| JP | 2014009177 A | 1/2014 | |
| JP | 2014093768 A | 5/2014 | |
| JP | 2014221859 A | 11/2014 | |
| JP | 2015101552 A | 6/2015 | |
| JP | 2017525798 A | 9/2017 | |
| WO | 03035797 A1 | 5/2003 | |
| WO | 2004046211 A1 | 6/2004 | |
| WO | 2004056843 A2 | 7/2004 | |
| WO | 2006092736 A2 | 9/2006 | |
| WO | 2008079729 A1 | 7/2008 | |
| WO | 2009153209 A1 | 12/2009 | |
| WO | 2012083497 A1 | 6/2012 | |
| WO | 2013087287 A1 | 6/2013 | |
| WO | 2014079621 A1 | 5/2014 | |
| WO | 2015084304 A1 | 6/2015 | |
| WO | 2016205513 A1 | 12/2016 | |
| WO | 2017003639 A2 | 1/2017 | |
| WO | 2017201076 A1 | 11/2017 | |
| WO | 2018112548 A1 | 6/2018 | |
| WO | 2019046409 A1 | 3/2019 | |

OTHER PUBLICATIONS

ECOLAB USA Inc., in connection with PCT/US2019/048684 filed Aug. 29, 2019, "The International Search Report and the Written Opinion of the International Searching Authority, or the Declaration", 14 pages, dated Nov. 21, 2019.

Fan et al., "Synthesis and Aggregation Behavior of a Hexameric Quaternary Ammonium Surfactant", Langmuir, vol. 27, pp. 10570-10579, Jul. 28, 2011.

Kawakami et al., "Antibacterial Activity of Radial Compounds with Peripheral Quaternary Ammonium Units", Transactions of the Materials Research Society of Japan, vol. 35[4], pp. 885-887, 2010.

Zhang et al., "PAMAM-Based Dendrimers with Different Alkyl Chains Self-Assemble on Silica Surfaces: Controllable Layer Structure and Molecular Aggregation", J. Phys. Chem. B, vol. 122, pp. 6648-6655, Jun. 13, 2018.

Zhou et al., "Cooperative binding and self-assembling behavior of cationic low molecular-weight dendrons with RNA molecules", Organic & Biomolecular Chemistry, vol. 4, pp. 581-585, 2006.

Brycki et al., "The biodegradation of monomeric and dimeric alkylammonium surfactants", Journal of Hazardous Materials, vol. 280, pp. 797-815, Aug. 6, 2014.

Gan et al., "Sugar-Based Ester Quaternary Ammonium Compounds and Their Surfactant Properties", Journal of Surfactants and Detergents, vol. 17, Issue 3, pp. 465-470, Jan. 18, 2014.

Negm et al., "Synthesis, Characterization and Biological Activity of Sugar-Based Gemini Cationic Amphiphiles", Journal of Surfactants and Detergents, vol. 11, Issue 3, pp. 215-221, Jun. 13, 2008.

Tan et al., "The use of quaternised chitosan-loaded PMMA to inhibit biofilm formation and downregulate the virulence-associated gene expression of antibiotic-resistant *Staphylococcus*", Biomaterials, vol. 33, Issue 2, pp. 365-377, Jan. 2012.

Zaky, Mohamad, "Biocidal Activities of Cationic Surface Active Starch and Its Transition Metal Complexes Against Different Bacterial Strains", Journal of Surfactants and Detergents, vol. 13, Issue 3, pp. 255-260, Jul. 2010.

Zhi et al., "Self-aggregation and antimicrobial activity of saccharide-cationic surfactants", Colloids and Surfaces A: Physicochemical and Engineering Aspects, vol. 456, pp. 231-237, Aug. 2014.

Zielinski et al., "Synteza nowych czwartorzedowych soli amoniowych do organofilizacji nanokompozytowych napelniaczy polimerowych", www.miesiecznikchemik.pl, 2007.

"Azamethonium", http://pubchem.ncbi.nlm.nih.gov/compound/9383, last modified Oct. 6, 2018 and accessed by Applicant Oct. 11, 2018.

Zhang et al., "Controllable Self-Assembly of Amphiphilic Dendrimers on a Silica Surface: The Effect of Molecular Topological Structure and Salinity", Journal of Physical Chemistry, vol. 8, pp. 10990-10999, Oct. 5, 2016.

Zhang et al., "Supporting Information", Beijing National Laboratory for Molecular Sciences, published with "Controllable Self-Assembly of Amphiphilic Dendrimers on a Silica Surface: Effect of Molecular Topological Structure and Salinity", 4 pages Oct. 5, 2016.

Somerscales, Euan F.C., "Fundamentals of Corrosion Fouling", Experimental Thermal and Fluid Science, vol. 14, pp. 335-355, 1997.

AkzoNobel, "Water clarifiers/deoilers", AkzoNobel Surface Chemistry in the Oil Industry, 2 pages, 2016.

Bi et al., "Dendrimer-Based Demulsifiers for Polymer Flooding Oil-in-Water Emulsions", Energy Fuels, vol. 31. No. 5, pp. 5395-5401, Apr. 20, 2017.

Krämer et al., "Dendritic polyamines: simple access to new materials with defined treelike structures for application in nonviral gene delivery", Chembiochem, vol. 5(8), pp. 1081-1087, Aug. 6, 2004.

Miller et al., "Non-viral CRISPR/Cas gene editing in vitro and in vivo enabled by synthetic nanoparticle co-delivery of Cas9 mRNA and sgRNA", Angew Chem Int Ed Engl., vol. 56(4), pp. 1059-1063, Jan. 19, 2017.

Ning et al., "Synthesis and characterization of a novel non-polyether demulsifier", Chemical Engineer, 3 pages, 2013.

Wang et al., "A novel environment-sensitive biodegradable polydisulfide with protonatable pendants for nucleic acid delivery", Journal of Controlled Release, vol. 120, pp. 250-258, May 11, 2007.

Zielinksi, Wojciech et al., "TI—Synthesis of new quaternary ammonium salts for organophilization of fillers for polymeric nanocomposites", D1: Database Chemical Abstracts [Online] chemical abstracts; XP55789968, Database accession No. 2007:1236240 Jan. 1, 2007.

Bosica et al., "Aza-Michael Mono-addition Using Acidic Alumina under Solventless Conditions", Molecules, vol. 21, 11 pages, Jun. 22, 2016.

Mann et al., "Acetal initiated cyclization of allylsilanes to highly functionalized piperidine derivatives", Tetrahedron Letters, vol. 29 (26), pp. 3247-3250, 1988.

Registry 790647-93-7, accessed online on Aug. 14, 2021, 1 page, registered Nov. 30, 2004.

Registry 881538-24-5, accessed online on Aug. 14, 2021, 1 page, registered Apr. 21, 2006.

Registry 881538-25-6, accessed online on Aug. 14, 2021, 1 page, registered Apr. 21, 2006.

Registry 881538-26-7, accessed online on Aug. 14, 2021, 1 page, registered Apr. 21, 2006.

Registry 930395-29-2, accessed online on Aug. 14, 2021, 1 page, registered Apr. 17, 2007.

Registry 951236-20-7, accessed online on Aug. 14, 2021, 1 page, registered Oct. 23, 2007.

Registry 951236-22-9, accessed online on Aug. 14, 2021, 1 page, registered Oct. 23, 2007.

Registry 951236-51-4, accessed online on Aug. 14, 2021, 1 page, registered Oct. 23, 2007.

Registry 1025555-14-9, accessed online on Aug. 14, 2021, 1 page, registered Jun. 5, 2008.

Registry 1025555-15-0, accessed online on Aug. 14, 2021, 1 page, registered Jun. 5, 2008.

Registry 1346596-75-5, accessed online on Aug. 14, 2021, 1 page, registered Nov. 30, 2011.

Registry 1346596-76-6, accessed online on Aug. 14, 2021, 1 page, registered Nov. 30, 2011.

Registry 1346596-77-7, accessed online on Aug. 14, 2021, 1 page, registered Nov. 30, 2011.

Registry 1801234-01-4, accessed online on Aug. 14, 2021, 1 page, registered Aug. 3, 2015.

Registry 1801234-02-5, accessed online on Aug. 14, 2021, 1 page, registered Aug. 3, 2015.

(56) References Cited

OTHER PUBLICATIONS

Registry 2000293-27-4, accessed online on Aug. 14, 2021, 1 page, registered Sep. 26, 2016.
Registry 2001056-21-7, accessed online on Aug. 14, 2021, 1 page, registered Sep. 27, 2016.
Twyman, Lance J., "Post synthetic modification of the hydrophobic interior of a water-soluble dendrimer", Tetrahedron Letters, vol. 41 (35), pp. 6875-6878, 2000.
Labade et al., "Cesium fluoride catalyzed Aza-Michael addition reaction in aqueous media", Monatsh Chem., vol. 142, pp. 1055-1059, Jul. 19, 2011.

USE OF MULTIPLE CHARGED IONIC COMPOUNDS DERIVED FROM POLYAMINES FOR WASTE WATER CLARIFICATION

CROSS-REFERENCE TO RELATED APPLICATIONS

This application is a Divisional application of U.S. Ser. No. 16/554,803, filed Aug. 29, 2019, which claims priority under 35 U.S.C. § 119 to provisional application Ser. No. 62/724,360, filed Aug. 29, 2018, all of which are herein incorporated by reference in their entirety.

This application is related to U.S. application Ser. No. 16/554,935, filed Aug. 29, 2019, which claims priority under 35 U.S.C. § 119 to provisional application Ser. No. 62/724, 398, filed on Aug. 29, 2018 and titled "MULTIPLE CHARGED IONIC COMPOUNDS DERIVED FROM POLYAMINES AND COMPOSITIONS THEREOF AND USE THEREOF AS REVERSE EMULSION BREAKER IN OIL AND GAS OPERERATIONS." The entire contents of these patent applications are hereby expressly incorporated herein by reference including, without limitation, the specification, claims, and abstract, as well as any figures, tables, or drawings thereof.

FIELD OF THE INVENTION

The present disclosure relates generally to the field of waste water clarification. In particular, the present disclosure relates to using a new class of multiple charged cationic or anionic compounds that are the reaction products of an aza-Michael Addition reaction between polyamines and activated olefins containing an ionic group for water clarification. The disclosed multiple charged cationic or anionic compounds or their salts have at least two cationic or anionic charges within each molecule. The disclosed compounds are useful as water clarification agents for treating a water system or waste water source from food and beverage, steel, automotive, transportation, refinery, pharmaceutical, metals, paper and pulp, chemical processing, and hydrocarbon processing industries.

BACKGROUND OF THE INVENTION

During a water treatment process, it is often necessary to separate solids/liquid or oils from water. Suspended solids or liquids/oils can be removed from water by a variety of processes, including sedimentation, straining, flotation, filtration, coagulation, flocculation, and emulsion breaking among others.

Water being treated for solids removal often has as little as several parts per billion of suspended solids and/or dispersed oils or may contain a lot of suspended solids and/or oils. Solids/liquid or liquid/liquid separation processes are designed to remove solids from liquids, or liquids from liquids.

While strictly mechanical means have been used to effect solids/liquid or oil/water separation, modern methods often rely on mechanical separation techniques that are augmented by inorganic, synthetic polymer, or natural polymeric materials to accelerate the rate at which solids, oils, or solids and oils can be removed from water. This process is generally referred as water clarification. The chemicals used for water clarification, such as inorganic, synthetic polymer, or natural polymeric materials are generally called water clarification agents.

Clarification generally refers to the removal of non-settleable material by coagulation, flocculation, and sedimentation. Coagulation is the process of destabilization of the colloid by neutralization of the surface charges of the colloid. Once neutralized, particles no longer repel each other and can come together to form larger settleable solids or oil droplets, which can then be removed from the water by gravitational settling or flotation. Coagulation is necessary for removal of colloidal sized suspended matter.

Flocculation is the process of bringing together the destabilized, "coagulated" particles to form a larger agglomeration or floe for increasing the solid-liquid separation process.

Examples of water clarification include the treatment of raw water with cationic coagulant polymers, to settle suspended particulates and make the water usable for industrial or municipal purposes. Other examples of these processes include the removal of colored soluble species from paper mill effluent wastes, use of organic flocculant polymers to flocculate industrial and municipal waste materials, sludge recovery, use of emulsion breaking and drainage aids in the manufacture of pulp and paper, and the use of flotation aids in mining processing.

The nature of the solids or oils to be removed and the mechanical process usually determine choices of clarification agents. For example, it is conventional to utilize a dual chemical/polymer program for clarification of raw water in which an aluminum chemistry is commonly used with an organic coagulant to remove soluble color and other contaminants. When colloidal solids need to be removed from water so that the biochemical oxygen demand, chemical oxygen demand, and total suspended solids being discharged to a receiving stream need to be minimized, a low molecular weight cationic coagulant followed by a higher molecular weight flocculant are typically used.

Water containing emulsified oil can be difficult to treat by physical processes alone. In such circumstances, demulsifying coagulants and flocculants can be used to break the emulsion and hasten agglomeration of the oil particles formed. Inorganic coagulants alone or in combination with organic polyelectrolytes have been used in de-emulsification.

However, the existing treatments are not completely satisfactory because they increase solids content, which can cause sludge disposal problems with other coagulants/flocculants for clarifying oily waste water from food and beverage, steel, automotive, transportation, refinery, pharmaceutical, metals, paper and pulp, chemical processing, and hydrocarbon processing industries.

Also, in industries such as food and beverage (F&B) and their downstream applications, organic water clarification agents are preferred over the inorganic counterparts, despite the conventional outperformance of inorganics compared to organic agents. For example, in F&B industries, sludge can be further used as pet feed or in land application, so the inorganic content must be maintained as low as possible. The other major disadvantage with using inorganic chemistries is scaling, especially in industries such as oil refineries. To mitigate these issues, efforts have been steered towards finding an equivalent organic replacement to the current inorganic line of products, especially for oil removal in a waste water system.

For more effective and efficient water clarification process, various chemicals as coagulant/flocculants were invented or investigated. These chemicals include various cationic polymers. However, better coagulant/flocculants are still needed because the existing ones are still unsatisfactory for all applications.

Accordingly, it is an objective to develop novel water clarification agents having improved water clarification properties.

It is a further objective of the disclosure to use the compounds disclosed herein in water clarification compositions, alone or in combination with other coagulant/flocculant agent(s) and other water clarification composition agents, for water clarification and/or for removing oil.

It is a further objective of the disclosure to use the compounds disclosed herein in water clarification compositions, in combination with inorganic agents, to provide a mechanism to decrease the overall usage of the inorganic agents.

These and other objects, advantages and features of the present disclosure will become apparent from the following specification taken in conjunction with the claims set forth herein.

BRIEF SUMMARY OF THE INVENTION

Disclosed herein are methods of clarifying a water system using novel compounds and water clarification compositions comprising the novel compounds. Particularly, the disclosed methods use or compositions comprise one or more multiple charged cationic compounds having two or more positive charges or anionic compounds having two or negative charges within a single molecule. These multiple charged ionic compounds are of various molecule sizes, derived from water soluble polyamines, and are water soluble.

The exemplary multiple charged cationic compounds disclosed herein have superior performance than conventional coagulants for clarifying raw, process and waste waters. The exemplary multiple charged cationic disclosed here also show improved performance when they are used as a coagulant for removing oil in a water source from food industry and oil refinery industry.

An advantage of the methods and compositions disclosed herein is that the multiple charged cationic or anionic compounds used in the methods or composition can be used as the sole treatment agent by using different polyamines or PEIs as starting material and different levels of incorporating ionic groups and their performances are often much better than the conventional coagulants.

In one aspect, disclosed herein is a water clarification composition, wherein the water clarification composition comprises a compound and one or more additional water clarification composition agents, wherein the compound is derived from an aza-Michael Addition Reaction between a polyamine (Michael donor) and an activated olefin (Michael acceptor) having an ionic group according to one of the following formulas

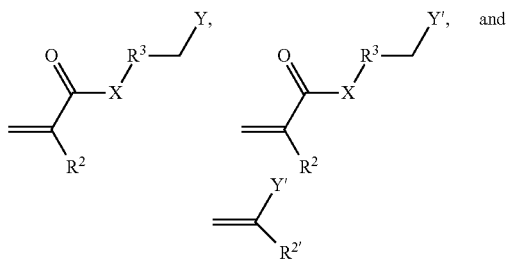

wherein X is NH or O; $R^2$ is H, $CH_3$, or an unsubstituted, linear or branched $C_2$-$C_{10}$ alkyl, alkenyl, or alkynyl group; $R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4; $R^3$ is absent or an unsubstituted, linear or branched $C_1$-$C_{30}$ alkylene group; Y is —$NR_4R_5R_6^{(+)}$, Y' is —COOH, —$SO_3H$, —$PO_3H$, —$OSO_3H$, —$OPO_3H$, or a salt thereof, and $R^4$, $R^5$, and $R^6$ are independently a $C_1$-$C_{10}$ alkyl group; wherein the compound is a multiple charged cationic compound having 2 or more positive charges or multiple charged anionic compound having 2 or more negative charges and wherein the water clarification composition reduces turbidity of the water system.

In another aspect, disclosed here is a method of clarifying a water system, wherein the method comprises providing a water clarification composition into a water system, wherein the water clarification composition comprises a compound or its salt and one or more additional water clarification composition agents, wherein the compound is derived from an aza-Michael Addition Reaction between a polyamine and an activated olefin having an ionic group according to one of the following formulas

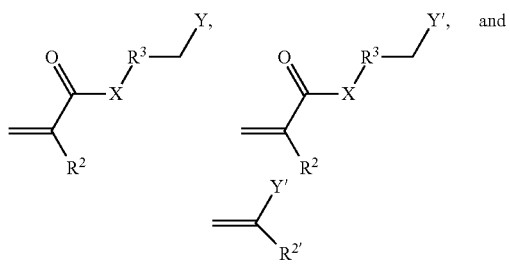

wherein X is NH or O; $R^2$ is H, $CH_3$, or an unsubstituted, linear or branched $C_2$-$C_{10}$ alkyl, alkenyl, or alkynyl group; $R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4; $R^3$ is absent or an unsubstituted, linear or branched $C_1$-$C_{30}$ alkylene group; Y is —$NR_4R_5R_6^{(+)}$; Y' is —COOH, —$SO_3H$, —$PO_3H$, —$OSO_3H$, —$OPO_3H$, or a salt thereof, and $R^4$, $R^5$, and $R^6$ are independently a $C_1$-$C_{10}$ alkyl group; wherein the compound is a multiple charged cationic compound having 2 or more positive charges or multiple charged anionic compound having 2 or more negative charges and wherein the water clarification composition reduces turbidity of the water system.

The forgoing summary is illustrative only and is not intended to be in any way limiting. In addition to the illustrative aspects, embodiments and features described above, further aspects, embodiments, and features of the present technology will become apparent to those skilled in the art from the following drawings and the detailed description, which shows and describes illustrative embodiments of the present technology. Accordingly, the figures and detailed description are also to be regarded as illustrative in nature and not in any way limiting.

Figure 1:
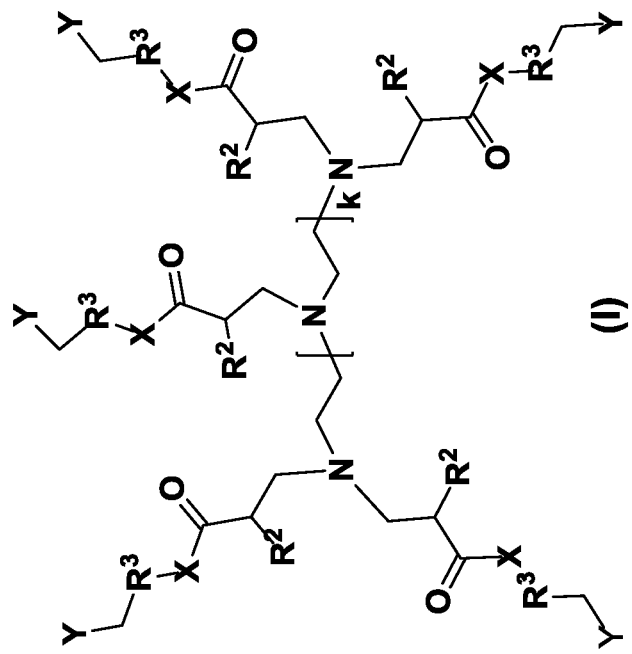
FIG. 1 shows an exemplary generic reaction scheme to produce a multiple charged cationic compound by an aza-Michael addition reaction between a linear polyamine and an activated olefin (α, β-unsaturated carbonyl compound) containing cationic group.
Figure 1:
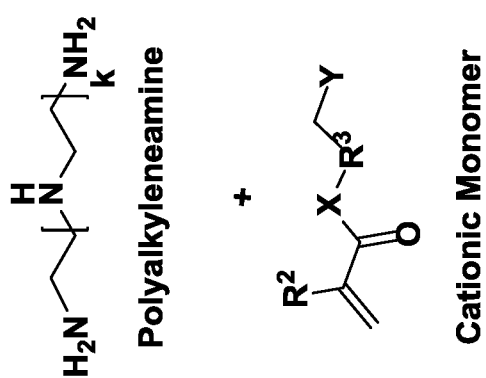

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

Disclosed herein are water clarification compositions comprising novel multiple charged cationic or anionic compounds and methods of using novel multiple charged cationic or anion compounds in a water clarification composition for clarifying a water system. Specifically, multiple charge cationic compounds having two or more positive charges or anionic compounds having two or more negative compounds derived from a polyamine (Michael donor) and activated olefin (Michael acceptor) through an aza-Michael are used in a water clarification composition to clarify a water system.

The embodiments of this disclosure are not limited to particular compositions and methods of use which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through error in these procedures; through differences in the manufacture, source, or purity of the ingredients used to make the compositions or carry out the methods; and the like. The term "about" also encompasses amounts that differ due to novel equilibrium conditions for a composition resulting from a particular initial mixture. Whether or not modified by the term "about", the claims include equivalents to the quantities.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about 30 carbon atoms, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about 30 carbon atoms, or typically, from 2 to about 10 carbon atoms. Alkynyl groups may be substituted or unsubstituted. Alkynyl groups may be substituted similarly to alkyl or alkenyl groups.

As used herein, the terms "alkylene", "cycloalkylene", "alkynylides", and "alkenylene", alone or as part of another substituent, refer to a divalent radical derived from an alkyl, cycloalkyl, or alkenyl group, respectively, as exemplified by —$CH_2CH_2CH_2$—. For alkylene, cycloalkylene, alkynylene, and alkenylene groups, no orientation of the linking group is implied.

The term "ester" as used herein refers to —$R^{30}COOR^{31}$ group. $R^{30}$ is absent, a substituted or unsubstituted alkylene, cycloalkylene, alkenylene, alkynylene, arylene, aralkylene, heterocyclylalkylene, or heterocyclylene group as defined herein. $R^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —$R^{32}NR^{33}R^{34}$ groups. $R^{32}$ is absent, a substituted or unsubstituted alkylene, cycloalkylene, alkenylene, alkynylene, arylene, aralkylene, heterocyclylalkylene, or heterocyclylene group as defined herein. $R^{33}$ and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{32'}NR^{33'}R^{34'}$ groups, wherein $R^{32'}$, $R^{33'}$, and $R^{34'}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —$R^{35}OH$ groups. $R^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —$R^{36}COOH$ groups. $R^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to —$R^{37}OR^{38}$ groups. $R^{37}$ is absent, a substituted or unsubstituted alkylene, cycloalkylene, alkenylene, alkynylene, arylene, aralkylene, heterocyclylalkylene, or heterocyclylene group as defined herein. $R^{38}$ is a substituted or unsubstituted alkyl, cycloalkyl, alkenyl, alkynyl, aryl, aralkyl, heterocyclylalkyl, or heterocyclyl group as defined herein.

The term "solvent" as used herein refers to any inorganic or organic solvent. Solvents are useful in the disclosed method or article, product, or composition as reaction solvent or carrier solvent. Suitable solvents include, but are not limited to, oxygenated solvents such as lower alkanols, lower alkyl ethers, glycols, aryl glycol ethers and lower alkyl glycol ethers. Examples of other solvents include, but are not limited to, methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Water is a solvent too. The solvent used herein can be of a single solvent or a mixture of many different solvents.

Glycol ethers include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

Acids

The compositions disclosed herein may include an acid. However, in some embodiments, the compositions disclosed herein are free of an acid.

Generally, acids, as used in this disclosure, include both organic and inorganic acids. Organic acids include, but not limited to, hydroxyacetic (glycolic) acid, formic acid, acetic acid, propionic acid, butyric acid, valeric acid, caproic acid, gluconic acid, itaconic acid, trichloroacetic acid, urea hydrochloride, and benzoic acid. Organic acids also include dicarboxylic acids such as oxalic acid, malonic acid, succinic acid, glutaric acid, maleic acid, fumaric acid, adipic acid, and terephthalic acid. Combinations of these organic acids can also be used. Inorganic acids include, but are not limited to, mineral acids, such as phosphoric acid, sulfuric acid, sulfamic acid, methylsulfamic acid, hydrochloric acid, hydrobromic acid, hydrofluoric acid, and nitric acid. Inorganic acids can be used alone, in combination with other inorganic acid(s), or in combination with one or more organic acid. Acid generators can be used to form a suitable acid, including for example generators such as potassium fluoride, sodium fluoride, lithium fluoride, ammonium fluoride, ammonium bifluoride, sodium silicofluoride, etc.

Examples of particularly suitable acids in this the methods or compositions disclosed herein include inorganic and organic acids. Exemplary inorganic acids include phosphoric, phosphonic, sulfuric, sulfamic, methylsulfamic, hydrochloric, hydrobromic, hydrofluoric, and nitric. Exemplary organic acids include hydroxyacetic (glycolic), citric, lactic, formic, acetic, propionic, butyric, valeric, caproic, gluconic, itaconic, trichloroacetic, urea hydrochloride, and benzoic. Organic dicarboxylic acids can also be used such as oxalic, maleic, fumaric, adipic, and terephthalic acid.

Percarboxylic Acids and Peroxycarboxylic Acid Compositions

A peroxycarboxylic acid (i.e. peracid) or peroxycarboxylic acid composition can be included in the articles, products, or compositions disclosed herein. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula R—(COOOH)$_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

A peroxycarboxylic acid composition, as used herein, refers to any composition that comprises one or more peracids, their corresponding acids, and hydrogen peroxide or or other oxidizing agents. A peroxycarboxylic acid composition can also include a stabilizer, fluorescent active tracer or compound, or other ingredients, as one skilled in the other would know.

As used herein, the terms "mixed" or "mixture" when used relating to "percarboxylic acid composition," "percarboxylic acids," "peroxycarboxylic acid composition" or "peroxycarboxylic acids" refer to a composition or mixture including more than one percarboxylic acid or peroxycarboxylic acid. Peracids such as peroxyacetic acid and peroxyoctanoic acid may also be used. Any combination of these acids may also be used.

In some embodiments, however, the articles, products, or compositions disclosed herein are free of a peroxycarboxylic acid or peroxycarboxylic acid composition.

Alkalinity Source or Base

The compositions disclosed herein may include an alkalinity source or a base. However, in some embodiments, the compositions disclosed herein are free of a base or alkalinity source.

The alkalinity source in turn comprises one or more bases or alkaline compounds. In general, an effective amount of the alkalinity source should be considered as an amount that provides the composition or use solution of the composition having a pH of at least about 8. When the us e solution has a pH of between about 8 and about 10, it can be considered mildly alkaline, and when the pH is greater than about 12, the solution can be considered caustic.

The alkalinity source can include an alkali metal carbonate, an alkali metal hydroxide, alkaline metal silicate, alkaline metal metasilicate, or a mixture thereof. Suitable metal carbonates that can be used include, for example, sodium or potassium carbonate, bicarbonate, sesquicarbonate, or a mixture thereof. Suitable alkali metal hydroxides that can be used include, for example, sodium, lithium, or potassium hydroxide. Examples of useful alkaline metal silicates include sodium or potassium silicate (with M$_2$O:SiO$_2$ ratio of 2.4 to 5:1, M representing an alkali metal) or metasilicate. A metasilicate can be made by mixing a hydroxide and silicate. The alkalinity source may also include a metal borate such as sodium or potassium borate, and the like.

The alkalinity source may also include ethanolamines, urea sulfate, amines, amine salts, and quaternary ammonium. The simplest cationic amines, amine salts and quaternary ammonium compounds can be schematically drawn thus:

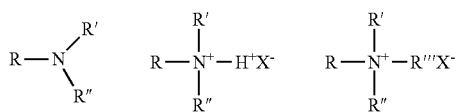

in which, R represents a long alkyl chain, R', R", and R'" may be either long alkyl chains or smaller alkyl or aryl groups or hydrogen and X represents an anion.

In some embodiments, the compositions are free of the alkalinity source or base.

Polyamines

A polyamine can have, but is limited to, a generic formula of NH$_2$—[R$^{10'}$]$_n$—NH$_2$, (RNH)$_n$—RNH$_2$, H$_2$N—(RNH)$_n$—RNH$_2$, or H$_2$N—(RN(R'))$_n$—RNH$_2$, wherein R$^{10'}$ is a linear or branched, unsubstituted or substituted C$_2$-C$_{10}$ alkylene group, or combination thereof; R is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkylene group, or combination thereof; R' is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkyl group, RNH$_2$, RNHRNH$_2$, or RN(RNH$_2$)$_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

Small molecule polyamines include, but are not limited to ethylenediamine, diethylenetriamine, triethylenetetramine, tetraethylenepentamine, pentaethylenehexamine, hexaethyleneheptamine, and tris(2-aminoethyl)amine.

Other possible polyamines include JEFFAMINE® monoamines, diamines, and triamines by Huntsman. These highly versatile products contain primary amino groups attached to the end of a polyether backbone normally based on propylene oxide (PO), ethylene oxide (EO), or a mixture of both oxides. JEFFAMINE® amines include a polyetheramine family consisted of monoamines, diamines and triamines based on the core polyether backbone structure. JEFFAMINE® amines also include high-conversion, and polytetramethylene glycol (PTMEG) based polyetheramines. These JEFFAMINE® amines have an average molecular weight (M$_W$) of from about 130 to about 4,000.

A polyamine used in this disclosure can be a polyamine derivative or modified polyamine, in which one or more of the NH protons, but not all, in the polyamine is substituted by an unsubstituted or substituted group. For example, an alkyl polyamine that contains one or more alkyl group connected to the nitrogen atom can be used to produce the multiple charged cationic or anionic compounds disclosed herein. In these PEI derivatives, only some of primary NH$_2$ or secondary NH protons are replaced by other non-proton groups and the remaining NH$_2$ or NH protons can still react with a Michael acceptor, such as an activated olefin containing a hydrophilic (ionic) group, by an aza-Michael Addition reaction.

One class of the polymeric polyamine includes polyethyleneimine (PEI) and its derivatives. Polyethyleneimine (PEI) or polyaziridine is a polymer with a repeating unit of CH$_2$CH$_2$NH and has a general formulation of NH$_2$(CH$_2$CH$_2$NH)$_n$—CH$_2$CH$_2$NH$_2$, wherein n can be from 2 to 10$^5$. The repeating monomer in PEI has a molecular weight of 43.07 and a nitrogen to carbon ratio of 1:2.

PEIs and their derivatives can linear, branched, or dendric. Linear polyethyleneimines contain all secondary amines, in contrast to branched PEIs which contain primary, secondary and tertiary amino groups. Totally branched, dendrimeric forms also exist and contain primary and tertiary amino groups. Drawings for unmodified linear, branched, and dendrimeric PEI are shown below.

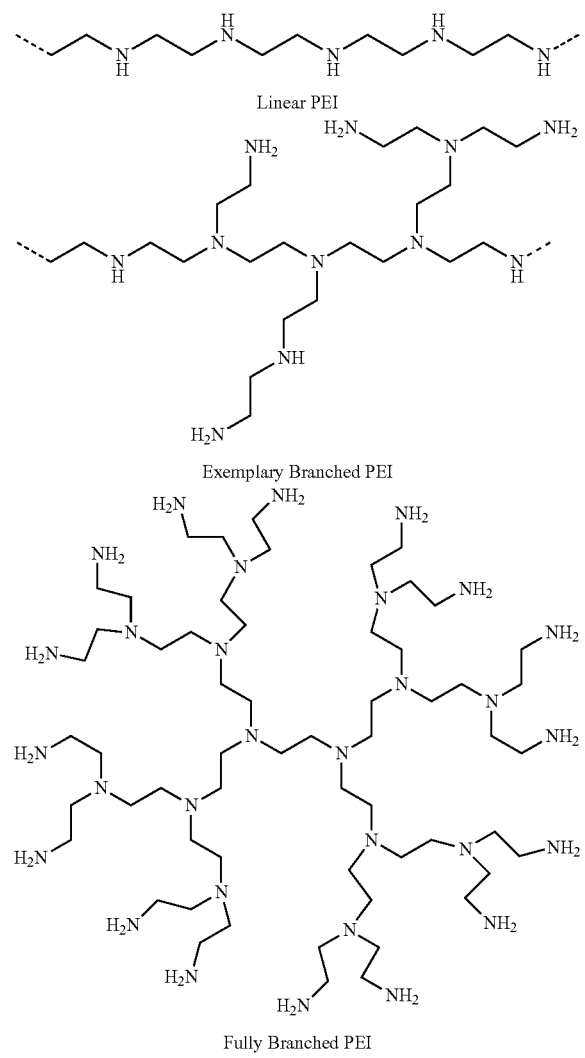

PEI derivatives are usually obtained by substituting proton(s) on the nitrogen atoms with different group. One such PEI derivative is ethoxylated and propoxylated PEI, wherein the polyethyleneimines are derivatized with ethylene oxide (EO) and/or propylene oxide (PO) side chains. Ethoxylation of PEIs can increase the solubility of PEIs.

PEI is produced on industrial scale. Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK. These PEIs have average molecular weights ($M_w$) of about 800, about 1,300, about 2,000, about 5,000, about 25,000, about 1,300/2,000/5,000, about 25,000, about 750,000, about 750,000, about 1,000,000, and about 2,000,000, respectively.

Two common used averages for molecular weight of a polymer are number average molecular weight ($M_n$) and weight average molecular weight ($M_w$). The polydispersity index (D) represents the molecular weight distribution of the polymers. $Mn=(\Sigma n_i M_i)/\Sigma n_i$, $M_w=(\Sigma n_i M_i^2)/\Sigma n_i M_i$, and $D=M_w/M_n$, wherein the index number, i, represents the number of different molecular weights present in the sample and $n_i$ is the total number of moles with the molar mass of $M_i$. For a polymer, $M_n$ and $M_w$ are usually different. For example, a PEI compound can have a $M_n$ of about 10,000 by GPC and $M_w$ of about 25,000 by LS.

Light Scattering (LS) can be used to measure $M_w$ of a polymer sample. Another easy way to measure molecular weight of a sample or product is gel permeation chromatography (GPC). GPC is an analytical technique that separates molecules in polymers by size and provides the molecular weight distribution of a material. GPC is also sometimes known as size exclusion chromatography (SEC). This technique is often used for the analysis of polymers for their both $M_n$ and $M_w$.

These commercially available and exemplary polyethyleneimines are soluble in water and available as anhydrous polyethyleneimines and/or modified polyethyleneimines provided in aqueous solutions or methoxypropanol (as for Lupasol® PO 100).

Suitable polyethyleneimine useful in the present disclosure may contain a mixture of primary, secondary, and tertiary amine substituents or mixture of different average molecular weights. The mixture of primary, secondary, and tertiary amine substituents may be in any ratio, including for example in the ratio of about 1:1:1 to about 1:2:1 with branching every 3 to 3.5 nitrogen atoms along a chain segment. Alternatively, suitable polyethyleneimine compounds may be primarily one of primary, secondary or tertiary amine substituents.

The polyamine that can be used to make the multiple charged cationic or anionic compounds disclosed herein can have a wide range of its average molecular weight. Different multiple charged cationic or anionic compounds with their characteristic average molecular weights can be produced by selecting different starting small molecule polyamines, polymeric PEIs, or mixture thereof. Controlling the size of polyamines or PEI and extent of modification by the activated olefin containing ionic groups, one can produce the multiple charged cationic or anionic compounds with a similar average molecular weight and multiple cationic charges or multiple anionic charges. Because of this character, one can produce and use different multiple charged cationic or anionic compounds for a wider range of applications that are using unmodified polyamine or PEIs.

Specifically, the polyamines that can be used to make the multiple charged cationic or anionic compounds disclosed here have an average molecular weight ($M_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, 2,000,000, or any value there between.

Aza-Michael Addition Reaction Between a Polyamine and Activated Olefin

The multiple charged cationic or anionic compounds in the reverse emulsion breaker compositions disclosed herein are derived from an aza-Michael Addition Reaction between a polyamine and an activated olefin containing a hydrophilic ionic group.

An aliphatic amine group may undergo an aza-Michael Addition reaction when in contact with an unsaturated hydrocarbon moiety (e.g., carbon-carbon double bond) that is in proximity of an electron withdrawing group such as carbonyl, cyano, or nitro group. Specifically, the Michael addition is a reaction between nucleophiles and activated olefin and alkyne functionalities, wherein the nucleophile adds across a carbon-carbon multiple bond that is adjacent to an electron withdrawing and resonance stabilizing activating group, such as a carbonyl group. The Michael addition nucleophile is known as the "Michael donor", the activated electrophilic olefin is known as the "Michael acceptor", and reaction product of the two components is known as the "Michael adduct." Examples of Michael donors include, but are not restricted to, amines, thiols, phosphines, carbanions, and alkoxides. Examples of Michael acceptors include, but are not restricted to, acrylate esters, alkyl methacrylates, acrylonitrile, acrylamides, maleimides, cyanoacrylates and vinyl sulfones, vinyl ketones, nitro ethylenes, $\alpha, \beta$-unsaturated aldehydes, vinyl phosphonates, acrylonitrile, vinyl pyridines, azo compounds, beta-keto acetylenes and acetylene esters.

As used herein, an "activated olefin" refers to a substituted alkene in which at least one of the double-bond carbon has a conjugated electron withdrawing group. Examples of activated olefins include, but not limited to, $\alpha, \beta$-unsaturated carbonyl compounds (such as $CH_2=CHCO-NH-CH_3$, alkyl-$CH=CH-CO$-alkyl, $CH_2=CH_2C(O)-O-CH_3$), $CH_2=CH-COOH$, $CH_2=CH(CH_3)-COOH$, $CH_2=CH-SO_3H$, and like.

It was found that the Aza-Michael addition can be used to synthesize the disclosed compounds without having to use a higher temperature greater than 200° C. and high pressure greater than normal atmosphere pressure and with a high yield (greater than 98%), sometimes within about 24 hours.

Aza-Michael addition reaction can be catalyzed by a strong acid or base. In some cases, some ionic liquids can function both as reaction media and catalyst. The preferred catalyst for the Aza-Michael addition reaction to synthesize the disclosed compounds is a base. Exemplary base catalyst can be hydroxide and amines. Because the reaction to synthesize the disclosed compounds uses a polyamine that usually include a primary amine group, the primary amine group itself can function as a catalyst for the reaction. In such embodiments, no additional catalyst is necessary, or an additional catalyst is optional. Other preferred catalysts include amidine and guanidine bases.

The use of solvent and/or diluent for the reaction is optional. When employed, a wide range of non-acidic solvents are suitable, such as, for example, water, ethers (e.g., tetrahydrofuran (THF)), aromatic hydrocarbons (e.g., toluene and xylene), alcohols (e.g., n-butanol), esters (e.g., ethyl 3-ethoxypropionate), and the like. A wide range of solvents can be used for the reaction because the synthesis process is relatively insensitive to solvent. When solvent (or diluent) is employed, loading levels can range from as low as about 10 wt-% up to about 80 wt-% and higher. The solvent loading level can be about 0 wt-%, from about 1 wt-% to about 10 wt-%, from about 10 wt-% to about 20 wt-%, from about 20 wt-% to about 30 wt-%, from about 30 wt-% to about 40 wt-%, from about 40 wt-% to about 50 wt-%, from about 50 wt-% to about 60 wt-%, from about 60 wt-% to about 70 wt-%, from about 70 wt-% to about 80 wt-%, from about 1 wt-% to about 20 wt-%, from about 20 wt-% to about 40 wt-%, from about 40 wt-% to about 60 wt-%, from about 60 wt-% to about 80 wt-%, from about 40 wt-% to about 70 wt-%, at least about 5 wt-%, about 15 wt-%, about 25 wt-%, about 35 wt-%, about 45 wt-%, about 55 wt-%, about 65 wt-%, about 75 wt-%, or any value there between of the final reaction mixture.

Generally, the reaction can be carried out at a temperature over a wide range of temperatures. The reaction temperature can range from about 0° C. to about 150° C., more preferably from about 50° C. to about 80° C. The temperature for contacting the polyamine and activated olefin can be from about 10° C. to about 140° C., about 20° C. to about 130° C., about 30° C. to about 120° C., about 40° C. to about 110° C., about 50° C. to about 100° C., about 60° C. to about 90° C., about 70° C. to about 80° C., about 0° C. to about 20° C., about 20° C. to about 40° C., about 40° C. to about 60° C., about 60° C. to about 80° C., about 80° C. to about 100° C., about 100° C. to about 120° C., about 120° C. to about 150° C., about 5° C., about 25° C., about 45° C., about 65° C., about 85° C., about 105° C., about 125° C., about 145° C., or any value there between. The reaction temperature can be about the same from starting of the reaction to end of the reaction or can be changed from one temperature to another while the reaction is going on.

The reaction time for the synthesis of the compounds disclosed herein can vary widely, depending on such factors as the reaction temperature, the efficacy and amount of the catalyst, the presence or absence of diluent (solvent), and the like. The preferred reaction time can be from about 0.5 hours to about 48 hours, from about 1 hour to about 40 hours, from about 2 hours to about 38 hours, from about 4 hours to about 36 hours, from 6 hours to about 34 hours, from about 8 hours to about 32 hours, from about 10 hours to about 30 hours, from about 12 hours to about 28 hours, from about 14 hours to 26 hours, from about 16 hours to 24 hours, from about 18 hours to 20 hours, from about 1 hour to 8 hours, from 8 hours to 16 hours, from 8 hours to about 24 hours, about 2 hours, about 4 hours, about 6 hours, about 8 hours, about 10 hours, about 14 hours, about 16 hours, about 18 hours, about 24 hours, about 30 hours, about 36 hours, or any values there between.

The reaction for the synthesis of the compounds disclosed herein can go to completion when one mole of the polyamine and two or more moles of the activated olefin are mixed together for a sufficient of time at a temperature described above.

The progression of the reaction can be typically monitored by ESI-MS and/or NMR spectroscopy for consumption of the monomer. The reaction products can be purified or separated by HPLC or other methods known by one skilled in the art. For reactions that proceeded to completion, the formed product can be separated by removal of solvent or by precipitation in a non-polar solvent that was the opposite of the reaction media. For the reactions in water, the formed product is precipitated from the aqueous reaction mixture. Higher pressure can speed-up the reaction. In some embodiments, if the reaction is carried out at a room temperature, the reaction can have a product yield of more than 98%, in some embodiments within about 16 hours.

Other Water Clarification Composition Agent in a Water Clarification Composition In addition to the multiple charged cationic or anionic compounds derived from polyamine as described herein, a water clarification composition in the present disclosure includes one or more additional water clarification composition agents.

The additional water clarification composition agent in the disclosed water clarification compositions can include, but is not limited to, an acid, carrier, dispersant, biocide, corrosion inhibitor, antioxidant, polymer degradation prevention agent, permeability modifier, foaming agent, anti-foaming agent, fracturing proppant, glass particulate, sand, fracture proppant/sand control agent, scavenger for $H_2S$, $CO_2$, and/or $O_2$, gelling agent, lubricant, and friction reducing agent, salt, or mixture thereof.

The additional water clarification composition agent in the disclosed water clarification compositions can also include, but not be limited to, an organic sulfur compound, de-emulsifier, asphaltene inhibitor, paraffin inhibitor, scale inhibitor, water clarifier, emulsion breaker, reverse emulsion breaker, gas hydrate inhibitor, a pH modifier, a surfactant, or a combination thereof.

Furthermore, the additional water clarification composition agent can be a sequestrant, solubilizer, lubricant, buffer, cleaning agent, rinse aid, preservative, binder, thickener or other viscosity modifier, processing aid, carrier, water-conditioning agent, or foam generator, threshold agent or system, aesthetic enhancing agent (e.g., dye, odorant, perfume), or other additive suitable for formulation with a reverse emulsion breaker, or mixtures thereof.

The additional water clarification composition agent in a water clarification composition will vary according to the particular water clarification composition being manufactured and its intend use as one skilled in the art will appreciate.

Alternatively, the water clarification composition does not contain or is free of one or more of the additional water clarification composition agents.

When one or more additional water clarification composition agents are used for preventing microbial or biofilm growth, they can be formulated together with the multiple charged cationic compounds derived from a primary or polyamine as described herein the same water clarification composition. Alternatively, some or all the additional water clarification composition agents can be formulated into one or more different formulations and be supplied to the water system. In other words, the additional water clarification composition agents can be provided into a water system independently, simultaneously, or sequentially.

Biocide and Carrier

In some embodiments, the water clarification compositions disclosed herein further include a biocide. In some other embodiments, the disclosed water clarification compositions herein further include a carrier. In some other embodiments, the disclosed water clarification compositions herein further include a biocide and carrier. In some embodiments, the disclosed methods or water clarification compositions herein may consist of one or more multiple charged cationic or anionic compounds disclosed herein and carrier. In some embodiments, the water clarification compositions disclosed herein consist of one or more multiple charged cationic or cationic compounds disclosed herein, a carrier, and a biocide.

Biocides suitable for use may be oxidizing or non-oxidizing biocides. Oxidizing biocides include, but are not limited to, bleach, chlorine, bromine, chlorine dioxide, peroxycarboxylic acid, peroxycarboxylic acid composition, and materials capable of releasing chlorine, bromine, or a peroxide. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bis-thiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis(bromoacetoxy)-2-butene, bis (tributyltin)oxide, 2-(tert-butylamino)-4-chloro-6-(ethyl-amino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo[2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

Suitable non-oxidizing biocides also include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

The composition can comprise from about 0.1 wt-% to about 10 wt-%, from about 0.5 wt-% to about 5 wt-%, or from about 0.5 wt-% to about 4 wt-% of a biocide, based on total weight of the composition.

A carrier in the disclosed water clarification composition can be water, an organic solvent, or a combination of water and an organic solvent. The organic solvent can be an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The composition can comprise from about 1 wt-% to about 80 wt-%, from about 5 wt-% to about 50 wt-%, from about 5 wt-% to about 45 wt-%, from about 5 wt-% to about 30 wt-%, from about 5 wt-% to about 25 wt-%, from about 5 wt-% to about 20 wt-%, from about 5 wt-% to about 15 wt-%, from about 5 wt-% to about 10 wt-%, from about 10 wt-% to about 35 wt-%, from about 10 wt-% to about 25 wt-%, or from about 10 wt-% to about 35 wt-% of the one or more carriers, based on total weight of the composition.

Corrosion Inhibitor

In some embodiments, the water clarification compositions disclosed herein further include a corrosion inhibitor. In some other embodiments, the disclosed water clarification compositions herein further include a corrosion inhibitor and carrier. In some other embodiments, the disclosed water clarification compositions herein further include a corrosion inhibitor, biocide, and carrier. In some embodiments, the disclosed water clarification compositions herein may consist of one or more multiple charged cationic or anionic compounds disclosed herein, one or more corrosion inhibitors and carrier. In some embodiments, the water clarification compositions disclosed herein consist of one or more multiple charged cationic or anionic compounds disclosed herein, a carrier, corrosion inhibitor, and a biocide. In some embodiments, the biocide is an oxidizing biocide. In some other embodiments, the biocide is a non-oxidizing biocide.

The water clarification composition can comprise from about 0.1 wt-% to about 20 wt-%, from about 0.1 wt-% to about 10 wt-%, or from 0.1 to about 5 wt-% of one or more corrosion inhibitors, based on total weight of the composition. A composition disclosed herein can comprise from 0 wt-% to about 10 wt-% of the one or more corrosion inhibitors, based on total weight of the composition. The composition can comprise about 1.0 wt-%, about 1.5 wt-%, about 2.0 wt-%, about 2.5 wt-%, about 3.0 wt-%, about 3.5 wt-%, about 4.0 wt-%, about 4.5 wt-%, about 5.0 wt-%, about 5.5 wt-%, about 6.0 wt-%, about 6.5 wt-%, about 7.0 wt-%, about 7.5 wt-%, about 8.0 wt-%, about 8.5 wt-%, about 9.0 wt-%, about 9.5 wt-%, about 10.0 wt-%, about 10.5 wt-%, about 11.0 wt-%, about 11.5 wt-%, about 12.0 wt-%, about 12.5 wt-%, about 13.0 wt-%, about 13.5 wt-%, about 14.0 wt-%, about 14.5 wt-%, or about 15.0 wt-% of the one or more corrosion inhibitors, based on total weight of the composition. Each water system can have its own requirements for using a corrosion inhibitor, and the weight percent of one or more corrosion inhibitors in the composition can vary with the water system in which it is used.

A corrosion inhibitor is needed to reduce corrosion of metals in the water system. Corrosion inhibitors for multi-metal protection are typically triazoles, such as, but not limited to, benzotriazole, halogenated triazoles, and nitro-substituted azoles.

The one or more corrosion inhibitors can be an imidazoline compound, a quaternary ammonium compound, a pyridinium compound, or a combination thereof.

The one or more corrosion inhibitor component can be an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (1A) or an imidazoline derivative. Representative imidazoline derivatives include an imidazolinium compound of Formula (2A) or a bis-quaternized compound of Formula (3A).

The one or more corrosion inhibitor component can include an imidazoline of Formula (1A):

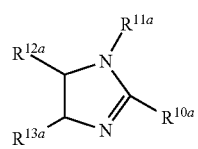

(1A)

wherein $R^{10a}$ is a $C_1$-$C_{20}$ alkyl or a $C_1$-$C_{20}$ alkoxyalkyl group; $R^{11a}$ is hydrogen, $C_1$-$C_6$ alkyl, $C_1$-$C_6$ hydroxyalkyl, or $C_1$-$C_6$ arylalkyl; and $R^{12a}$ and $R^{13a}$ are independently hydrogen or a $C_1$-$C_6$ alkyl group. Preferably, the imidazoline includes an $R^{10a}$ which is the alkyl mixture typical in tall oil fatty acid (TOFA), and $R^{11a}$, $R^{12a}$ and $R^{13a}$ are each hydrogen.

The one or more additional corrosion inhibitor component can be an imidazolinium compound of Formula (2A):

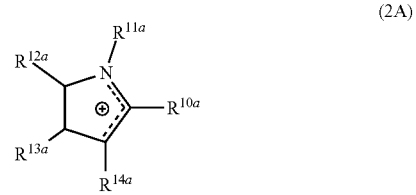

(2A)

wherein $R^{10a}$ is a $C_1$-$C_{20}$ alkyl or a $C_1$-$C_{20}$ alkoxyalkyl group; $R^{11a}$ and $R^{14a}$ are independently hydrogen, $C_1$-$C_6$ alkyl, $C_1$-$C_6$ hydroxyalkyl, or $C_1$-$C_6$ arylalkyl; $R^{12a}$ and $R^{13a}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The one or more additional corrosion inhibitors can be a bis-quaternized compound having the formula (3A):

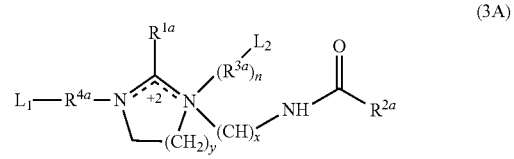

(3A)

wherein $R^{1a}$ and $R^{2a}$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R^{3a}$ and $R^{4a}$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H, —COOR$^{5a}$, —CONH$_2$, —CONHR$^{5a}$, or —CON(R$^{5a}$)$_2$; $R^{5a}$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R^{1a}$ and $R^{2a}$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R^{3a}$ and $R^{4a}$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H; and $L_2$ is absent, H, —COOH, —SO$_3$H, or —PO$_3$H. For example, $R^{1a}$ and $R^{2a}$ can be derived from a mixture of tall oil fatty acids and are predominantly a mixture of $C_{17}H_{33}$ and $C_{17}H_{31}$ or can be $C_{16}$-$C_{18}$ alkyl; $R^{3a}$ and $R^{4a}$ can be $C_2$-$C_3$ alkylene such as —$C_2H_2$—; n is 1 and $L_2$ is —COOH or n is 0 and $L_2$ is absent or H; x is 2; y is 1; $R^{3a}$ and $R^{4a}$ are —$C_2H_2$—; and $L_1$ is —COOH.

It should be appreciated that the number of carbon atoms specified for each group of formula (3A) refers to the main chain of carbon atoms and does not include carbon atoms that may be contributed by substituents.

The one or more corrosion inhibitors can be a bis-quaternized imidazoline compound having the formula (3A) wherein $R^{1a}$ and $R^{2a}$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R^{4a}$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is -COOH, —$SO_3H$, or —$PO_3H$; and $L_2$ is absent or H. Preferably, a bis-quaternized compound has the formula (3A) wherein $R^{1a}$ and $R^{2a}$ are each independently $C_{16}$-$C_{18}$ alkyl; $R^{4a}$ is —$C_2H_2$—; x is 2; y is 1; n is 0; $L_1$ is —COOH, —$SO_3H$, or —$PO_3H$ and $L_2$ is absent or H.

The one or more corrosion inhibitors can be a quaternary ammonium compound of Formula (4A):

(4A)

wherein $R^{1a}$, $R^{2a}$, and $R^{3a}$ are independently $C_1$ to $C_{20}$ alkyl, $R^{4a}$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [$N^+R^{5a}R^{6a}R^{7a}R^{8a}$][$X^-$] wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [$N^+R^{5a}R^{6a}R^{7a}R^{8a}$][$X^-$] wherein $R^{5a}$, $R^{6a}$, $R^{7a}$, and $R^{8a}$ contain one to 18 carbon atoms and at least one aryl group, and X is Cl, Br, or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The one or more corrosion inhibitor component can be a pyridinium salt such as those represented by Formula (5A):

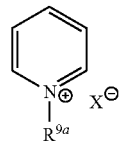

(5A)

wherein $R^{9a}$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The one or more additional corrosion inhibitors can be a phosphate ester, monomeric or oligomeric fatty acid, alkoxylated amine, or mixture thereof.

The one or more corrosion inhibitor component can be a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a broader distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The one or more corrosion inhibitors can be a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The one or more corrosion inhibitors can be an alkoxylated amine. The alkoxylated amine can be an ethoxylated alkyl amine. The alkoxylated amine can be ethoxylated tallow amine.

Dispersant

In some embodiments, the water clarification compositions disclosed herein can further comprise a dispersant. A dispersant keeps particulate matter present in the water of a water system dispersed, so that it does not agglomerate. The composition can comprise can comprise from about 0.1 wt-% to about 10 wt-%, from about 0.5 wt-% to about 5 wt-%, or from about 0.5 wt-% to about 4 wt-% of a dispersant, based on total weight of the composition.

A dispersant may be an acrylic acid polymer, maleic acid polymer, copolymer of acrylic acid with sulfonated monomers, alkyl esters thereof, or combination thereof. These polymers may include terpolymers of acrylic acid, acrylamide and sulfonated monomers. These polymers may also include quad-polymers consisting of acrylic acid and three other monomers.

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

Other Additional Water Clarification Composition Agents

In some embodiments, the water clarification compositions disclosed herein further include an additional water clarification composition agent. The additional water clarification composition agent can be an organic sulfur compound, de-emulsifier, an asphaltene inhibitor, a paraffin inhibitor, a scale inhibitor, an emulsifier, a water clarifier, an emulsion breaker, a gas hydrate inhibitor, a pH modifier, a surfactant, or a combination thereof.

The water clarification composition can further comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. Such compounds are used as synergists in the composition. The organic sulfur compound can constitute from about 0.5 wt-% to about 15 wt-% of the composition, based on total weight of the composition, preferably about 1 wt-% to about 10 wt-% and more preferably from about 1 wt-% to about 5 wt-%. The organic sulfur compound can about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 11 wt-%, about 12 wt-%, about 13 wt-%, about 14 wt-%, or about 15 wt-% of the composition.

The water clarification composition can further comprise a de-emulsifier. Preferably, the demulsifier comprises an oxyalkylate polymer, such as a polyalkylene glycol. The de-emulsifier can constitute from about 0.1 wt-% to about 10 wt-%, from about 0.5 wt-% to about 5 wt. %, or from about 0.5 wt-% to about 4 wt-% of the composition, based on total weight of the composition. The de-emulsifier can constitute about 0.5 wt-%, about 1 wt-%, about 1.5 wt-%, about 2 wt-%, about 2.5 wt-%, about 3 wt-%, about 3.5 wt-%, about 4 wt-%, about 4.5 wt-%, or about 5 wt-% of the composition.

The water clarification composition can further comprise an asphaltene inhibitor. The composition can comprise from about 0.1 wt-% to about 10 wt-%, from about 0.1 wt-% to about 5 wt-%, or from about 0.5 wt-% to about 4 wt-% of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The water clarification composition can further comprise a paraffin inhibitor. The composition can comprise from about 0.1 wt-% to about 10 wt-%, from about 0.1 wt-% to about 5 wt-%, or from about 0.5 wt-% to about 4 wt-% of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The water clarification composition can further comprise a scale inhibitor. The composition can comprise from about 0.1 wt-% to about 20 wt-%, from about 0.5 wt-% to about 10 wt-%, or from about 1 wt-% to about 10 wt-% of a scale inhibitor, based on total weight of the composition. Suitable scale inhibitors include, but are not limited to, phosphates, phosphate esters, phosphoric acids, phosphonates, phosphonic acids, polyacrylamides, mono-, bis- and oligomeric phosphinosuccinic acid (PSO) derivatives, polycarboxylic acid, hydrophobically modified polycarboxylic acid, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The water clarification composition can further comprise an emulsifier. The composition can comprise from about 0.1 wt-% to about 10 wt-%, from about 0.5 wt-% to about 5 wt-%, or from about 0.5 wt-% to about 4 wt-% of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The water clarification composition can further comprise a water clarifier. The composition can comprise from about 0.1 wt-% to about 10 wt-%, from about 0.5 wt-% to about 5 wt-%, or from about 0.5 wt-% to about 4 wt-% of a water clarifier, based on total weight of the composition. Suitable water clarifiers include, but are not limited to, inorganic metal salts such as alum, aluminum chloride, and aluminum chlorohydrate, or organic polymers such as acrylic acid-based polymers, acrylamide-based polymers, polymerized amines, alkanolamines, thiocarbamates, and cationic polymers such as diallyldimethylammonium chloride (DADMAC).

The water clarification composition can further comprise an emulsion breaker. The composition can comprise from about 0.1 wt-% to about 10 wt-%, from about 0.5 wt-% to about 5 wt-%, or from about 0.5 wt-% to about 4 wt-% of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The water clarification composition can further comprise a hydrogen sulfide scavenger. The composition can comprise from about 1 wt-% to about 50 wt-%, from about 1 wt-% to about 40 wt-%, or from about 1 wt-% to about 30 wt-% of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The water clarification composition can further comprise a gas hydrate inhibitor. The composition can comprise from about 0.1 wt-% to about 25 wt-%, from about 0.5 wt-% to about 5 wt-%, or from about 1 wt-% to about 10 wt-% of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The water clarification composition can further comprise a kinetic hydrate inhibitor. The composition can comprise from about 0.1 wt-% to about 25 wt-%, from about 0.5 wt-% to about 20 wt-%, or from about 1 wt-% to about 10 wt-% of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The water clarification composition can further comprise a pH modifier. The composition can comprise from about 0.1 wt-% to about 20 wt-%, from about 0.5 wt-% to about 10 wt-%, or from about 0.5 wt-% to about 5 wt-% of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The water clarification composition can further comprise a surfactant. The composition can comprise from about 0.1 wt-% to about 10 wt-%, from about 0.5 wt-% to about 5 wt-%, or from about 0.5 wt-% to about 4 wt-% of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

The water clarification composition can further comprise additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (e.g., dyes, odorants, perfumes), or other additives suitable for formulation with a corrosion inhibitor composition, and mixtures thereof. Additional agents or additives will vary according to the particular water clarification composition being manufactured and its intend use as one skilled in the art will appreciate.

Alternatively, the water clarification composition does not contain any of the additional water clarification composition agents or additives.

Additionally, the water clarification composition can be formulated into compositions comprising the following components as shown in Tables 1A-1B. These formulations include the ranges of the components listed and can optionally include additional agents. The values in Tables 1A-1B below are weight percentages.

TABLE 1A

Exemplary Water Clarification Compositions

| Component | 1 | 2 | 3 | 4 | 5 | 6 | 7 | 8 | 9 | 10 | 11 | 12 |
|---|---|---|---|---|---|---|---|---|---|---|---|---|
| Multiple charged cationic or anionic compounds | 0.1-20 | 0.1-20 | 0.1-20 | 0.1-20 | 0.1-20 | 0.1-20 | 10-20 | 10-20 | 10-20 | 10-20 | 10-20 | 0.1-20 |
| Organic solvent | 5-40 | — | 5-50 | — | 5-50 | 5-50 | 5-40 | — | 5-50 | — | — | 10-20 |
| corrosion inhibitor | 0.1-20 | 0.1-20 | — | — | — | — | 0.1-20 | 0.1-20 | — | — | — | 0.1-20 |
| Additional Coagulant/Flocculant | 0.1-5 | 0.1-5 | 0.1-5 | 0.1-5 | — | — | 0.1-5 | 0.1-5 | 0.1-5 | — | — | 0.1-5 |
| Scale inhibitor | 1-10 | 1-10 | 1-10 | 1-10 | 1-10 | — | 1-10 | 1-10 | 1-10 | 1-10 | — | 1-10 |
| Dispersant | — | — | — | — | — | — | — | — | — | — | — | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |
| Water | 0.00 | 0-40 | 0-10 | 0-60 | 0-15 | 0-25 | 0.00 | 0-40 | 0-10 | 0-65 | 0-75 | |

TABLE 1B

Exemplary Water Clarification Compositions

| Component | 13 | 14 | 15 | 16 | 17 | 18 | 19 | 20 | 21 | 22 | 23 | 24 |
|---|---|---|---|---|---|---|---|---|---|---|---|---|
| Multiple charged cationic or anionic compounds | 0.1-20 | 0.1-20 | 0.1-20 | 0.1-20 | 0.1-20 | 0.1-20 | 10-20 | 10-20 | 10-20 | 10-20 | 10-20 | 10-20 |
| Organic solvent | — | 10-20 | — | 10-35 | 10-35 | — | 10-15 | — | — | 10-35 | 10-35 | — |
| Additional corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Additional Coagulant/Flocculant | 0.1-5 | — | — | — | — | — | 0.1-5 | — | — | — | — | — |
| Scale inhibitor | 1-10 | 1-10 | — | — | 1-10 | — | 1-10 | 1-10 | — | — | — | 1-10 |
| Dispersant | 0.1-25 | 0.1-25 | 0.1-25 | — | — | — | 0.1-25 | 0.1-25 | 0.1-25 | — | 0.1-25 | — |
| Biocide | — | — | — | — | — | 0.5-5 | 0.5-5 | 0.5-5 | 0.5-5 | 0.5-5 | — | — |
| Water | 0-20 | 0-5 | 0-35 | 0-25 | 0-15 | 0-55 | 0.00 | 0-20 | 0-30 | 0-20 | 0.00 | 0-50 |

Water System or Waste Water Source

In some embodiments, the water system in the disclosed methods herein is an industrial water system. In some embodiments, the water system is an industrial waste water source or system. In other embodiments, the water system can be, but is not limited to, a cooling water system, including an open recirculating system, closed and once-through cooling water system, boilers and boiler water system, petroleum well system, downhole formation, geothermal well, and other water system in oil and gas field applications, a mineral washing system, flotation and benefaction system, paper mill digester, washer, bleach plant, stock chest, white water system, paper machine surface, black liquor evaporator in the pulp industry, gas scrubber and air washer, continuous casting processes in the metallurgical industry, air conditioning and refrigeration system, process waters, including industrial and petroleum process water, indirect contact cooling and heating water, water reclamation system, water purification system, membrane filtration water system, food processing stream (meat, vegetable, sugar beets, sugar cane, grain, poultry, fruit and soybean), waste treatment system, clarifier, liquid-solid application, municipal sewage treatment, municipal water system, potable water system, aquifer, water tank, sprinkler system, water system used in oil refinery industry, or water heater.

In some embodiments, the water system is a cooling water system, including open recirculating, closed and once-through cooling water system, paper machine surface, food processing stream, waste treatment system, water system used in oil refinery industry, or potable water system.

In some embodiments, the water system is a waste water source from a factory, residential home, industrial processing, or like. In some embodiments, the waste water source comprises oil-in-water emulsion. In some embodiments, the waste water source is a water source comprising solid or liquid particles inside water.

In some embodiments, the waste water source is an oily waste water from food and beverage, steel, automotive, transportation, refinery, pharmaceutical, metals, paper and pulp, chemical processing, and hydrocarbon processing industries.

In other embodiments, the waste water source is an oily waste water from food and beverage process and water system used in oil refinery industry. In yet some other embodiments, the waste water source is an oily waste water in oil and gas operations.

Use of the Methods or Compositions Disclosed

In some embodiments, for the methods disclosed herein, providing a water clarification composition into a water system means that the water clarification composition, multiple charged cationic or anionic compounds, or a use solution thereof is added into the water system or a fluid of the water system. In other embodiments, providing a water clarification composition into a water system means adding the water clarification composition, multiple charged cationic or anionic compounds, or a use solution thereof to the water of the water system. In some other embodiments, providing a water clarification composition into a water system means adding the water clarification composition, multiple charged cationic or anionic compounds, or a use solution thereof to a fluid which contacts or mixes with the water system. The water clarification composition or multiple charged cationic or anionic compounds may be added continuously, or intermittently when more compounds or compositions may be needed.

A use solution of a water clarification composition or one or more multiple charged cationic or anionic compounds as used herein refers to a diluted solution for the composition or compounds by a diluent. A diluent as used herein refers to water, the water of the water system, or one of the carriers or solvents defined herein. The water clarification composition or the compounds can be diluted by a factor of 0.5, 1, 2, 3, 4, 5, 6, 7, 8, 9, 10, 11-1,000,000, or any value there between to generate a use solution and then provide the use solution to a water system. In this disclosure, when a composition or multiple charged cationic or anionic compounds are applied, either the composition/compounds or use solution thereof is applied.

In some embodiments, the water clarification composition or multiple charged cationic or anionic compounds may be added to the water of the water system in an amount ranging from about 1 ppm to about 1000 ppm. In other embodiments, the amount of the water clarification composition or multiple charged cationic or anionic compounds in the water of the water system or in the waste water source may range from about 5 ppm to about 100 ppm, about 5 ppm to about 75 ppm, about 5 ppm to about 50 ppm, about 5 ppm to about 40 ppm, about 5 ppm to about 30 ppm, about 10 ppm to about 60 ppm, about 10 ppm to about 50 ppm, about 10 ppm to about 40 ppm, about 10 ppm to about 30 ppm, about 20 ppm to about 60 ppm, about 20 ppm to about 50 ppm, about 20 ppm to about 40 ppm, or about 20 ppm to about 30 ppm, about 25 ppm to about 75 ppm, or about 25 ppm to about 50 ppm. In some embodiments, the water clarification composition or multiple charged cationic or anionic compounds may be added to the water to an amount ranging from about 100 ppm to about 1000 ppm, about 125 ppm to about 1000 ppm, about 250 ppm to about 1000 ppm, or about 500 ppm to about 1000 ppm.

The water clarification composition or multiple charged cationic or anionic compounds can be used for clarifying a water system or a waste water source in oil and gas applications such as by treating the water system or waste water source with an effective amount of the compound or composition as described herein. The compounds and compositions can be used in any industry where it is desirable to clarify a water system or water source.

The water clarification composition or multiple charged cationic or anionic compounds can be used in a condensate/oil systems/gas system, or any combination thereof. For example, the water clarification composition or multiple charged cationic or anionic compounds can be used in the water of a heat exchanger. The water clarification composition or multiple charged cationic or anionic compounds can be applied to a liquid produced, or used in the production, transportation, storage, and/or separation of crude oil or natural gas. The water clarification composition or multiple charged cationic or anionic compounds can be applied to a gas stream used or produced in a coal-fired process, such as a coal-fired power plant.

The water clarification composition or multiple charged cationic or anionic compounds can be applied to a liquid or waste water source produced or used in a waste-water process, a farm, a slaughter house, a land-fill, a municipality waste-water plant, a coking coal process, or a biofuel process.

A fluid to which the water clarification composition or multiple charged cationic or anionic compounds can be introduced can be an aqueous medium. The aqueous medium can comprise water, gas, and optionally liquid hydrocarbon.

A fluid to which the water clarification composition or multiple charged cationic or anionic compounds can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. The fluid or gas can be a refined hydrocarbon product.

A fluid or gas treated with the water clarification composition or multiple charged cationic or anionic compounds can be at any selected temperature, such as ambient temperature or an elevated temperature. The fluid (e.g., liquid hydrocarbon) or gas can be at a temperature of from about 40° C. to about 250° C. The fluid or gas can be at a temperature of from about −50° C. to about 300° C., from about 0° C. to about 200° C., from about 10° C. to about 100° C., or from about 20° C. to about 90° C. The fluid or gas can be at a temperature of at a temperature of about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., or about 40° C. The fluid or gas can be at a temperature of about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., or about 100° C.

The water clarification composition or multiple charged cationic or anionic compounds can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the water clarification composition or multiple charged cationic or anionic compounds are introduced can be contained in and/or exposed to diverse types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The water clarification composition or multiple charged cationic or anionic compounds can be introduced into a fluid or gas of the water system by any appropriate method for ensuring dispersal through the fluid or gas. For examples, the water clarification composition or multiple charged cationic or anionic compounds can be added to the hydrocarbon fluid before the hydrocarbon fluid contacts the surface.

The water clarification composition or multiple charged cationic or anionic compounds can be added at a point in a flow line upstream from the point at which water clarification is desired. The water clarification composition or multiple charged cationic or anionic compounds can be injected using mechanical equipment such as chemical injection pumps, piping tees, injection fittings, atomizers, quills, and the like.

The water clarification composition or multiple charged cationic or anionic compounds can be pumped into an oil and/or gas pipeline using an umbilical line. A capillary injection system can be used to deliver the water clarification composition or multiple charged cationic or anionic compounds to a selected fluid.

A fluid to which the water clarification composition or multiple charged cationic or anionic compounds can be introduced can be an aqueous medium. The aqueous medium can comprise water, gas, and optionally liquid hydrocarbon. A fluid to the water clarification composition or multiple charged cationic or anionic compounds can be introduced can be a liquid hydrocarbon.

The water clarification composition or multiple charged cationic or anionic compounds can be introduced into a liquid and a mixture of several liquids, a liquid and gas, liquid, solid, and gas. The water clarification composition or multiple charged cationic or anionic compounds can be injected into a gas stream as an aqueous or non-aqueous solution, mixture, or slurry.

The fluid or gas can be passed through an absorption tower comprising the water clarification composition or multiple charged cationic or anionic compounds.

The water clarification composition or multiple charged cationic or anionic compounds can be applied to a fluid or gas to provide any selected concentration. In practice, the water clarification composition or multiple charged cationic or anionic compounds are typically added to a flow line to provide an effective treating dose of the water clarification composition or multiple charged cationic or anionic compounds from about 0.01 ppm to about 5,000 ppm. The water clarification composition or multiple charged cationic or anionic compounds can be applied to a fluid or gas to provide an active concentration of about 1 parts per million (ppm) to about 1,000,000 ppm, about 1 parts per million (ppm) to about 100,000 ppm, or about 10 ppm to about 75,000 ppm. The polymer salts/compositions can be applied to a fluid to provide an actives concentration of about 100 ppm to about 10,000 ppm, about 200 ppm to about 8,000 ppm, or about 500 ppm to about 6,000 ppm. The actives concentration means the concentration of water clarification composition or multiple charged cationic or anionic compounds.

The water clarification composition or multiple charged cationic or anionic compounds can be applied to a water system or a waste water source to provide an active concentration of about 0.1 ppm, about 0.5 ppm, about 1 ppm, about 2 ppm, about 5 ppm, about 10 ppm, about 20 ppm, about 100 ppm, about 200 ppm, about 500 ppm, or about 1,000 ppm. The polymer salts/compositions can be applied to a water system or a waste water source to provide an actives concentration of about 0.125 ppm, about 0.25 ppm, about 0.625 ppm, about 1 ppm, about 1.25 ppm, about 2.5 ppm, about 5 ppm, about 10 ppm, or about 20 ppm. Each water system or waste water source can have its own dose level requirements, and the effective dose level of the water clarification composition or multiple charged cationic or anionic compounds to sufficiently reduce the turbidity of the water system or waste water source can vary with the water system in which it is used.

The water clarification composition or multiple charged cationic or anionic compounds can be applied continuously, in batch, or a combination thereof. The water clarification composition or multiple charged cationic or anionic compounds dosing can be continuous. The water clarification composition or multiple charged cationic or anionic compounds dosing can be intermittent (e.g., batch treatment) or can be continuous/maintained and/or intermittent.

Dosage rates for continuous treatments typically range from about 10 ppm to about 500 ppm, or about 10 ppm to about 200 ppm. Dosage rates for batch treatments typically range from about 10 ppm to about 400,000 ppm, or about 10 ppm to about 20,000 ppm. The water clarification composition or multiple charged cationic or anionic compounds can be applied as a pill to a pipeline, providing a high dose (e.g., 20,000 ppm) of the composition.

The flow rate of a flow line in which the water clarification composition or multiple charged cationic or anionic compounds is used can be between 0.1 and 100 feet per second, or between 0.1 and 50 feet per second. The water clarification composition or multiple charged cationic or anionic compounds can also be formulated with water in order to facilitate addition to the flow line.

The surface can be a part of a wellbore or equipment used in the production, transportation, storage, and/or separation of a fluid such as crude oil or natural gas.

More specifically, the surface can be a part of equipment used a coal-fired process, a waste-water process, a farm, a slaughter house, a land-fill, a municipality waste-water plant, a coking coal process, or a biofuel process. Preferably, the surface can be a part of equipment used in the production of crude oil or natural gas.

The equipment can comprise a pipeline, a storage vessel, downhole injection tubing, a flow line, or an injection line.

The water clarification composition or multiple charged cationic or anionic compounds are useful for process or waste water source in the food service or food processing industries.

The water clarification composition or multiple charged cationic or anionic compounds can also be used for clarifying a water system or waste water source in other industrial process, such as those from heaters, cooling towers, boilers, retort waters, rinse waters, aseptic packaging wash waters, and the like.

The water clarification composition or multiple charged cationic or anionic compounds can be used to treat a water or waste water source from janitorial and/or housekeeping applications, food processing, and in laundry applications.

The water clarification composition or multiple charged cationic or anionic compounds can be dispensed in any suitable method generally known by one skilled in the art. For example, a spray-type dispenser can be used. A spray-type dispenser functions by impinging a water spray upon an exposed surface of a composition to dissolve a portion of the composition, and then immediately directing the concentrate solution including the composition out of the dispenser to a storage reservoir or directly to a point of use.

The water clarification composition or multiple charged cationic or anionic compounds can be dispensed by immersing either intermittently or continuously into the water, fluid, or gas of the water system. The water clarification composition or multiple charged cationic or anionic compounds can then dissolve, for example, at a controlled or predetermined rate. The rate can be effective to maintain a concentration of the dissolved compounds or compositions that are effective for use according to the methods disclosed herein.

The water clarification composition disclosed herein can comprise from about 10 wt-% to about 90 wt-% of the carrier, biocide, corrosion inhibitor, additional water clarification composition agent, a combination thereof and from about 10 wt-% to about 90 wt-% of one or more multiple charged cationic or anionic compounds, from about 20 wt-% to about 80 wt-% of the carrier, biocide, corrosion inhibitor, additional water clarification composition agent, a combination thereof and from about 20 wt-% to about 80 wt-% of one or more multiple charged cationic or anionic compounds, from about 30 wt-% to about 70 wt-% of the carrier, biocide, corrosion inhibitor, additional water clarification composition agent, a combination thereof and from about 40 wt-% to about 60 wt-% of one or more multiple charged cationic or anionic compounds, or from about 1 wt-% to about 10 wt-% of the carrier, biocide, corrosion inhibitor, additional water clarification composition agent, a combination thereof and from about 10 wt-% to about 90 wt. % of one or more multiple charged cationic or anionic compounds.

In one aspect, disclosed herein is a water clarification composition, wherein the water clarification composition comprises a compound and one or more additional water clarification composition agents, wherein the compound is derived from an aza-Michael Addition Reaction between a polyamine and an activated olefin having an ionic group according to one of the following formulas

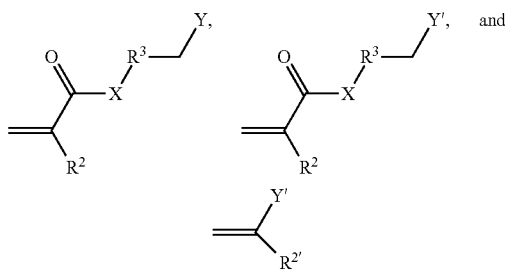

wherein X is NH or O; $R^2$ is H, $CH_3$, or an unsubstituted, linear or branched $C_2$-$C_{10}$ alkyl, alkenyl, or alkynyl group; $R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4; $R^3$ is absent or an unsubstituted, linear or branched $C_1$-$C_{30}$ alkylene group; Y is —$NR_4R_5R_6^{(+)}$; Y' is —COOH, —$SO_3H$, —$PO_3H$, —$OPO_3H$, —$OSO_3H$, or a salt thereof; and $R^4$, $R^5$, and $R^6$ are independently a $C_1$-$C_{10}$ alkyl group; wherein the compound is a multiple charged cationic compound having 2 or more positive charges or multiple charged anionic compound having 2 or more negative charges and wherein the water clarification composition reduces turbidity of the water system.

In another aspect, disclosed here is a method of clarifying a water system, wherein the method comprises providing a water clarification composition into a water system, wherein the water clarification composition comprises a compound or its salt and one or more additional water clarification composition agents, wherein the compound is derived from an aza-Michael Addition Reaction between a polyamine and an activated olefin having an ionic group according to one of the following formulas

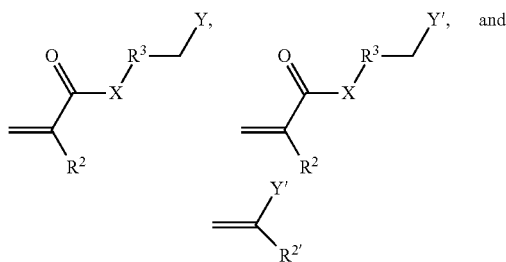

wherein X is NH or O; $R^2$ is H, $CH_3$, or an unsubstituted, linear or branched $C_2$-$C_{10}$ alkyl, alkenyl, or alkynyl group; $R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4; $R^3$ is absent or an unsubstituted, linear or branched $C_1$-$C_{30}$ alkylene group; Y is —$NR_4R_5R_6^{(+)}$; Y' is —COOH, —$SO_3H$, —$PO_3H$, —$OPO_3H$, —$OSO_3H$, or a salt thereof; and $R^4$, $R^5$, and $R^6$ are independently a $C_1$-$C_{10}$ alkyl group; wherein the compound is a multiple charged cationic compound having 2 or more positive charges or multiple charged anionic compound having 2 or more negative charges and wherein the water clarification composition reduces turbidity of the water system.

The structures of and the reactions leading to the exemplary multiple charged cationic compounds (I) using a linear polyethyleneimine is shown in FIG. 1. The scheme for preparation of exemplary cationic polymer compositions (II) using a branched polyethyleneimine is shown in FIG. 2.

Figure 2:
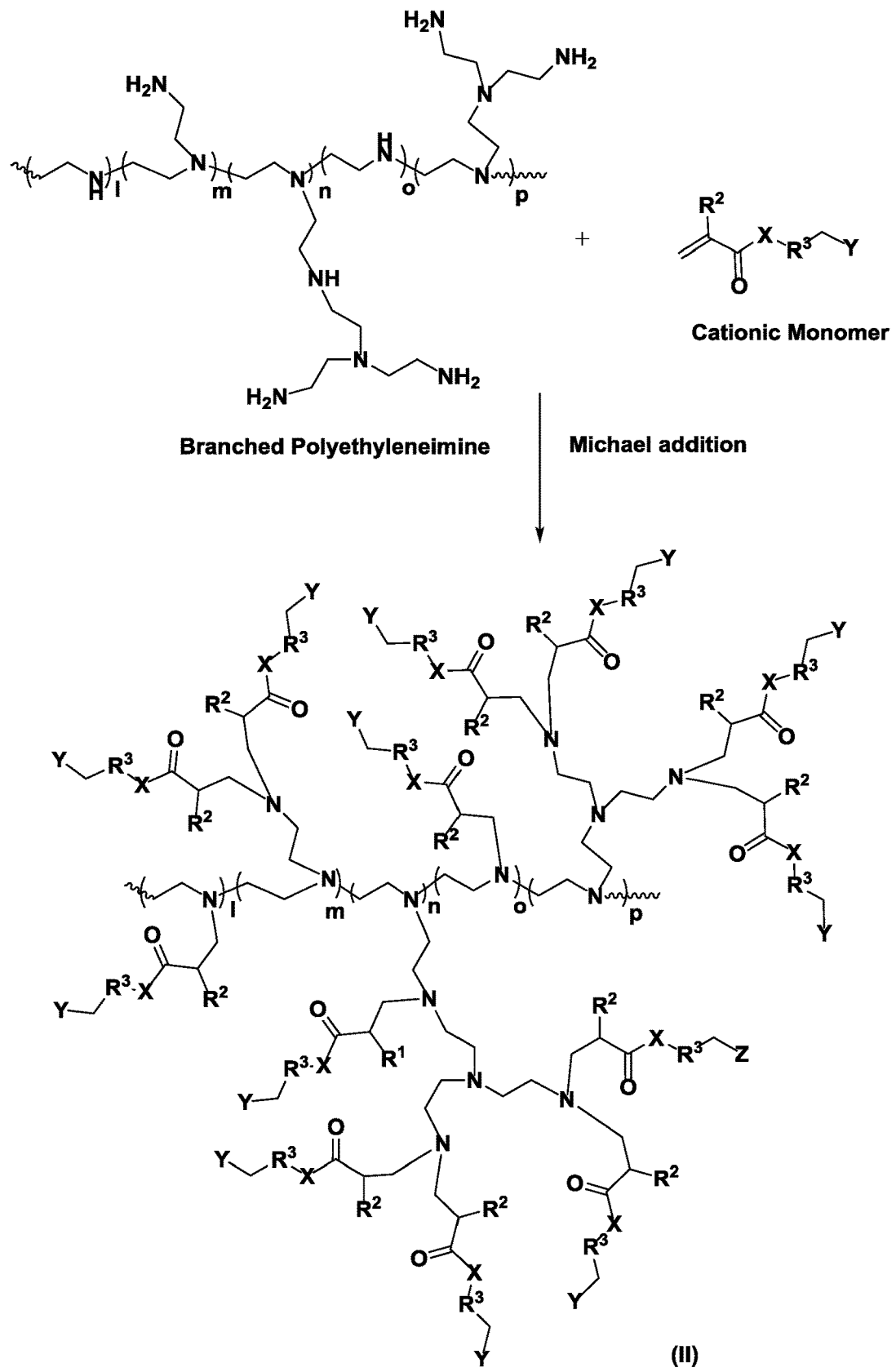
FIG. 2 shows an exemplary generic reaction scheme to produce a multiple charged cationic compound by an aza- Michael addition reaction between a branch polyamine and an activated olefin (α, β-unsaturated carbonyl compound) containing cationic group.

In FIG. 1 and FIG. 2, k, l, m, n, o, or p is an integer of 1-100; X is NH or O; $R^2$ is H, $CH_3$, or an unsubstituted, linear or branched $C_2$-$C_{10}$ alkyl group; $R^3$ is absent or an unsubstituted, linear or branched $C_1$-$C_{30}$ alkylene group; Y is —$NR^4R^5R^{6(+)}$ or a salt thereof; $R^4$, $R^5$, and $R^6$ are independently $C_1$-$C_{10}$ alkyl group or benzyl group.

The structures I and II in FIG. 1 and FIG. 2 are depiction of generalized and exemplary reaction products. In structures I and II, all the secondary and primary amines in the polyethyleneimine react with the activated olefins so that no secondary amines remain. It is possible that in the disclosed multiple charged cationic or anionic compounds, some secondary or primary amine groups do not react completely with the activated olefins and remain as primary or secondary amines in multiple charged cationic or anionic compounds or their salts.

In some embodiments, the polyamine is $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000. The monomer in a polyamine, e.g., the R or R' group, can be the same or different. In this disclosure, a polyamine refers to both small molecule polyamine when n is from 1 to 9 and polymeric polyamine when n is from 10 to 1,000,000.

In other words, the multiple charged cationic or anionic compounds can be one having the generic formula of $NA_2$-$[R^{10'}]_n$-$NA_2$, $(RNA)_n$-$RNA_2$, $A_2N$—$(RNA)_n$-$RNA_2$, or $A_2N$—$(RN(R'))_n$—$RNA_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNA_2$, $RNARNA_2$, or $RN(RNA_2)_2$; n can be from 2 to 1,000,000; A is H or

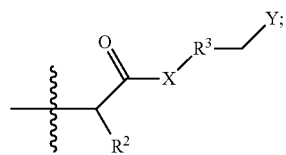

or one of H,

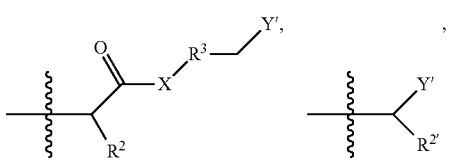

or a combination thereof, each of the compounds contain at least 2 non-proton and cationic or anionic A groups, at least 3 non-proton and cationic or anionic A groups, at least 4 non-proton and cationic or anionic A groups, at least 5 non-proton and cationic or anionic A groups, or more than 6 and cationic or anionic A groups. In some embodiments, A is H or positively charged

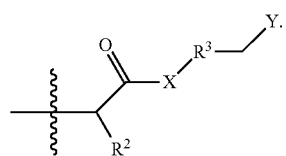

In some other embodiments, A is H or negatively charged

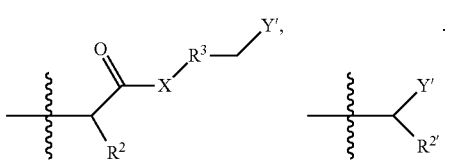

In some embodiments, at least two of the primary $NH_2$ protons are

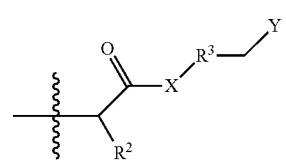

and the rest of primary $NH_2$ protons remains. In some embodiments, at least two of the primary $NH_2$ protons are

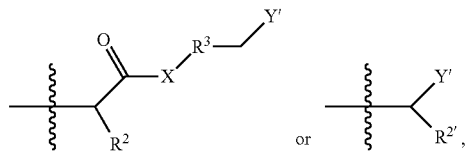

and the rest of primary $NH_2$ protons remains. In some other embodiments, all of the primary $NH_2$ protons are replaced by

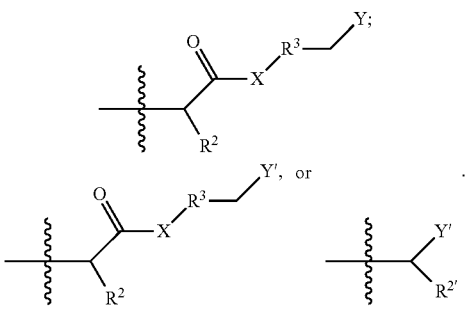

In some embodiments, some of primary $NH_2$ and secondary NH proton are replaced by

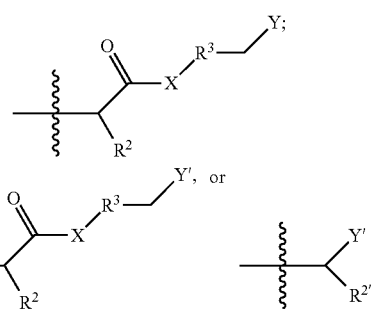

In some embodiments, all of primary $NH_2$ and some of secondary NH proton are replaced by

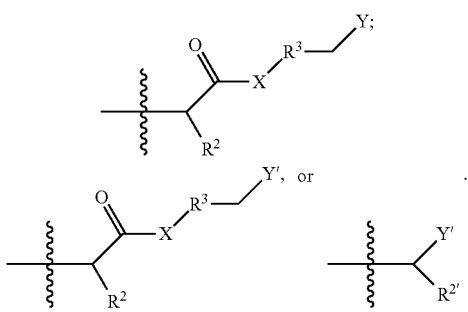

In some embodiments of the disclosed compounds herein, X is NH. In some other embodiments, X is O.

In some embodiments, $R^2$ is H. In some embodiments, $R^2$ is $CH_3$. In yet some other embodiments, $R^2$ is $CH_3CH_3$, $CH_2CH_2CH_3$, or $CH(CH_3)_2$.

In some embodiments, Y is —$NR_4R_5R_6^{(+)}$. In some other embodiments, Y is —$NR_4R_5R_6^{(+)}$, and $R^4$, $R^5$, and $R^6$ are independently $CH_3$. In yet some other embodiments, Y is —NR$_4$R$_5$R$_6^{(+)}$, and R$^4$ and R$^5$, independently CH$_3$, and R$^6$ is a C$_2$-C$_{12}$ aromatic alkyl. In some other embodiments, Y is —NR$_4$R$_5$R$_6^{(+)}$, and R$^4$ and R$^5$, independently CH$_3$, and R$^6$ is —CH$_2$—C$_6$H$_6$.

In some embodiments, Y is —NR$_4$R$_5$R$_6^{(+)}$ and the counter ion for Y any negative charged ion or species. In some other embodiments, the counter ion for Y is chloride, bromide, fluoride, iodide, acetate, aluminate, cyanate, cyanide, dihydrogen phosphate, dihydrogen phosphite, formate, carbonate, hydrogen carbonate, hydrogen oxalate, hydrogen sulfate, hydroxide, nitrate, nitrite, thiocyanate, or a combination thereof.

In some embodiments, Y' is —COOH or salt thereof. In some other embodiments, Y' is —SO$_3$H, —OSO$_3$H or salt thereof. In yet some other embodiments, Y' is —OPO$_3$H, —PO$_3$H, or salt thereof. In some other embodiments, Y' is an acidic species or salt thereof.

In some embodiments, R$^3$ is CH$_2$. In some other embodiments, R$^3$ is CH$_2$CH$_2$. In other embodiments, R$^3$ is C(CH$_3$)$_2$. In yet some other embodiments, R$^3$ is an unsubstituted, linear, and saturated C$_1$-C$_{10}$ alkylene group. In some embodiments, R$^3$ is an unsubstituted, linear, and unsaturated C$_1$-C$_{10}$ alkylene group.

In some embodiments, R$^3$ is a linear C$_8$-C$_{18}$ alkyl, alkenyl, or alkynyl group. In some other embodiments, R$^3$ is a branched C$_8$-C$_{20}$ alkyl, alkenyl, or alkynyl group.

In some embodiments, the polyamine is a linear, branched, or dendrimer polyamine with a general formula of —[RNH]$_n$—, wherein R is —CH$_2$CH$_2$—, —CH$_2$CH$_2$CH$_2$—, —CH(CH$_3$)CH$_2$—, a linear or branched, unsubstituted or substituted C$_4$-C$_{10}$ alkylene group, or combination thereof and n is an integer of 3, 4, 5, 6, 7-9, or 10 to 1,000,000.

In some embodiments, the polyamine is a linear, branched, or dendrimer polyamine with a general formula of (RNH)$_n$—RNH$_2$, wherein R is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkylene group, or combination thereof and n can be from 2 to 1,000,000. In some embodiments, R is the same in each monomer. In some other embodiments, R can be different from one monomer to another monomer.

In some other embodiments, the polyamine is a linear, branched, or dendrimer polyamine with a general formula of H$_2$N—(RNH)$_n$—RNH$_2$, wherein R is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkylene group, or combination thereof and n can be from 2 to 1,000,000. In some embodiments, R is the same in each monomer. In some other embodiments, R can be different from one monomer to another monomer.

In yet some other embodiments, the polyamine is a linear, branched, or dendrimer polyamine with a general formula of H$_2$N—(RN(R'))$_n$—RNH$_2$, wherein R is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkylene group, or combination thereof; R' is —CH$_2$—, —CH$_2$CH$_2$—, —CH$_2$CH$_2$CH$_2$—, —CH(CH$_3$)CH$_2$—, a linear or branched, unsubstituted or substituted C$_4$-C$_{10}$ alkyl group, RNH$_2$, RNHRNH$_2$, or RN(RNH$_2$)$_2$; and n can be from 2 to 1,000,000. In some embodiments, R or R' is the same in each monomer. In some other embodiments, R or R' can be different from one monomer to another monomer.

In some embodiments, the polyamine is one with a general formula of NH$_2$—[R$^{10'}$]$_n$—NH$_2$, wherein R$^{10'}$ is a linear or branched, unsubstituted or substituted C$_4$-C$_{10}$ alkylene group, or combination thereof and n is an integer of 3, 4, 5, 6, 7-9, or 10 to 1,000,000. In some other embodiments, R$^{10'}$ can be different from one monomer to another monomer.

In some embodiments, the polyamine is one or more of polyamines under JEFFAMINE® by Huntsman.

In some embodiments, the polyamine is an unmodified polyamine. In some other embodiments, the polyamine is a modified polyamine. As used herein, a "modified polyamine" refers to a polyamine in which one or more NH protons is substituted by a non-proton group, such as an alkyl.

In yet some embodiments, the polyamine is an ethoxylated polyamine, propylated polyamine, polyamine with polyquat, polyamine with polyglycerol, or combination thereof.

In some embodiments, the polyamine is diamine or triamine having an average molecular weight (M$_w$) of from about 130 to about 4,000.

In yet some other embodiments, the polyamine is a linear, branched, or dendrimer polyethyleneimine. In some other embodiments, the polyamine comprises only primary and secondary amine groups. In some embodiments, the polyamine comprises only primary, secondary, and tertiary amine groups. In some other embodiments, the polyamine comprises only primary and tertiary amine groups.

In some embodiments, the polyamine is a single compound. In some other embodiments, the polyamine is a mixture of two or more different polyamines, wherein the different polyamines have different molecular weight, different structure, or both.

In some embodiments, the polyamine has an average molecular weight (M$_w$) of from about 130 to about 2,000,000 Da. In some other embodiments, the polyamine has an average molecular weight (M$_w$) of from about 130 to about 5,000 Da. In yet some other embodiments, the polyamine has an average molecular weight (M$_w$) of from about 130 to about 25,000 Da.

In some embodiments, the polyamine has an average molecular weight (M$_w$) of about 60-200, about 100-400, about 100-600, about 600-5,000, about 600-800, about 800-2,000, about 800-5,000, about 100-2,000,000, about 100-25,000, about 600-25,000, about 800-25,000, about 600-750,000, about 800-750,000, about 25,000-750,000, about 750,000-2,000,000, about 100, about 200, about 300, about 400, about 500, about 600, about 700, about 800, about 1,000, about 1,500, about 2,000, about 3,000, about 5,000, about 8,000, about 10,000, about 15,000, about 20,000, about 50,000, about 100,000, about 250,000, about 500,000, about 1,000,000, 2,000,000, or any value there between.

In some embodiments, the compound is a mixture derived from a linear polyethyleneimine and (3-Acrylamidopropyl)trimethylammonium chloride (APTAC). In some other embodiments, the compound is a mixture derived from a linear polyethyleneimine and [3-(Methacryloylamino)propyl]trimethylammonium chloride (MAPTAC).

In some other embodiments, the multiple charged cationic or anionic compound is a mixture derived from a branched polyethyleneimine and 3-Acrylamidopropyl)trimethylammonium chloride (APTAC). In some other embodiments, the compound is a mixture derived from a linear polyethyleneimine and [3-(Methacryloylamino)propyl]trimethylammonium chloride (MAPTAC).

In some embodiments, the activated olefin is (3-Acrylamidopropyl)trimethylammonium chloride (APTAC), [3-(Methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

In some other embodiments, the activated olefin is (3-Acrylamidopropyl)trimethylammonium chloride (APTAC), [3-(Methacryloylamino)propyl]trimethylammonium chloride (MAPTAC), or mixture thereof.

In some other embodiments, the activated olefin is 2-(acryloyloxy)-N,N,N-trimethylethanaminium chloride (DMAEA-MCQ), N,N-dimethylaminoethyl acrylate benzyl chloride quaternary salt (DMAEA-BCQ), 2-(methacryloyloxy)-N,N,N-trimethylethan-1-aminium methyl sulfate (DMAEA-MSQ), or a mixture thereof.

In some embodiments, the activated olefin is acrylic acid, methacrylic acid, itaconic acid, maleic acid, vinylsulfonic acid, vinylphosphonic acid, or mixture thereof.

In some other embodiments, the activated olefin is 2-acrylamido-2-methylpropane sulfonic acid (AMPS), 3-(allyloxy)-2-hydroxypropane-1-sulfonate, or mixture thereof.

In some other embodiments, wherein the activated olefin is vinylsulfonic acid, vinylphosphonic acid, or mixture thereof.

In yet some other embodiments, when the activated olefin contains anionic group that can bear negative charge at an alkaline pH, the counter positive ions for the negative charges include, but are not limited to, alkali metal ions, $Li^+$, $Na^+$, $K^+$, $NH_4^+$, a quaternary ammonium ion, etc.

In some embodiments, the compound is an aza-Michael Addition reaction product of (3-Acrylamidopropyl) trimethylammonium chloride (APTAC) and tetraethylenepentamine, E-100 (a mixture of tetraethylenepentamine (TEPA), pentaethylenehexamine (PEHA), and hexaethyleneheptamine (HEHA)), Pentaethylenehexamine (PEHA), or diethylenetriamine (DETA), respectively.

In some embodiments, the compound is an aza-Michael Addition reaction product of (3-Acrylamidopropyl) trimethylammonium chloride (APTAC) and a polyethylenimine with an average molecular weight ($M_w$) of about 1,300, a polyethylenimine with an average molecular weight ($M_w$) of about 5,000, a polyethylenimine with an average molecular weight ($M_w$) of about 25,000, or a polyethylenimine with an average molecular weight ($M_w$) of about 750,000, respectively.

In some embodiments, the compound is one or more of

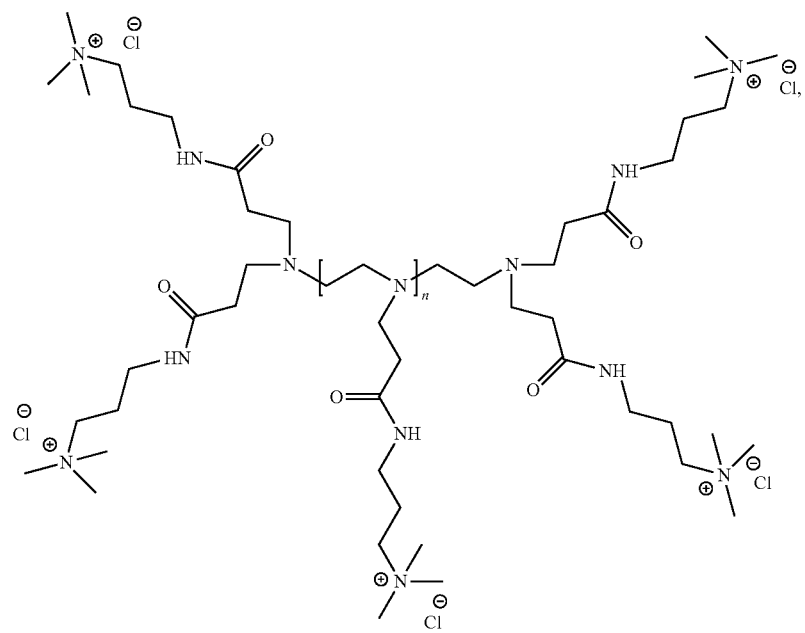

wherein n=0-1000. It should be understood that when n is greater than 2, the compound can be a mixture of more than two cationic compounds, which differ from each other by the exact locations of NH replacements.
In some other embodiments, wherein the compound is
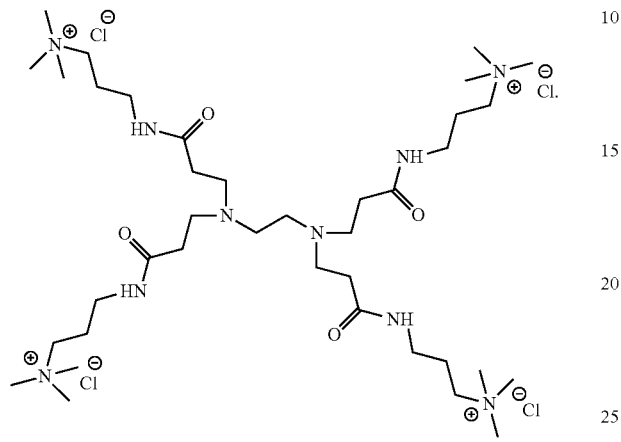
In some other embodiments, the compound is
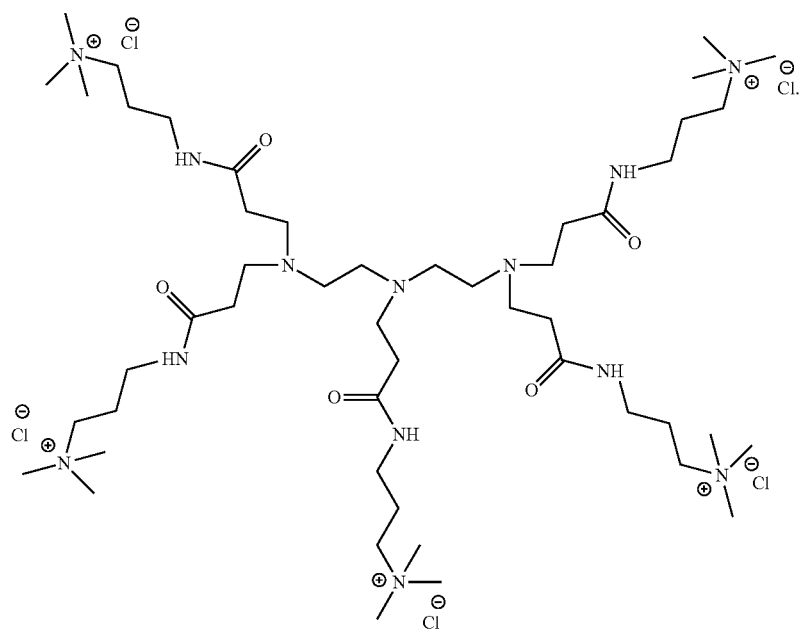

In some other embodiments, wherein the compound is

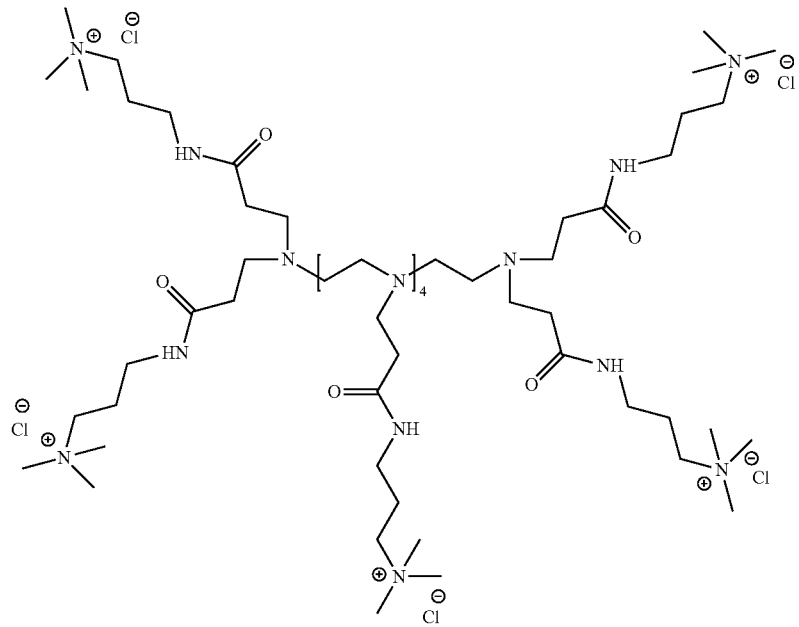

In some embodiments, the multiple charged cationic or anionic compound has an average molecular weight ($M_w$) of from about 100 to about 2,000,000 Da. In some other embodiments, the multiple charged cationic or anionic compound has an average molecular weight ($M_w$) of from about 100 to about 50,000 Da. In yet some other embodiments, the multiple charged cationic or anionic compound has an average molecular weight ($M_w$) of from about 100 Da to about 600 Da, from about 100 Da to about 1,000 Da, from about 100 Da to about 1,400 Da, from about 100 Da to about 3,000 Da, from about 100 Da to about 5,500 Da, or from about 100 Da to about 10,000 Da, from about 100 Da to about 20,000 Da, from about 100 Da to about 30,000 Da, or from about 100 Da to about 40,000 Da.

In some embodiments, the multiple charged cationic compound has at least 2, at least 3, at least 4, at least 5, at least 6, at least 7, at least 8, at least 9, or at least 10 positive charges. In some other embodiments, the compound has from 10 to 1,000 positive charges, or any value there between positive charges.

In some embodiments, the multiple charged cationic compound has at least 2, at least 3, at least 4, at least 5, at least 6, at least 7, at least 8, at least 9, or at least 10 negative charges. In some other embodiments, the compound has from 10 to 1,000 positive charges, or any value there between negative charges.

In some embodiments, the compound is soluble or dispersible in water.

In some embodiments, the water clarification composition further comprises a carrier. In some embodiments, the carrier is the carrier is water, an organic solvent, or a mixture thereof.

In some embodiments, the carrier is an organic solvent. In some other embodiments, the carrier is a mixture of an organic solvent and water.

In some embodiments, the organic solvent is an alcohol, a hydrocarbon, a ketone, an ether, an alkylene glycol, a glycol ether, an amide, a nitrile, a sulfoxide, an ester, or any combination thereof. In some other embodiments, the organic solvent is an alcohol, an alkylene glycol, an alkyleneglycol alkyl ether, or a combination thereof. In yet some embodiments, the organic solvent is methanol, ethanol, propanol, isopropanol, butanol, isobutanol, monoethyleneglycol, ethyleneglycol monobutyl ether, or a combination thereof.

In some embodiments, the organic solvent is methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, a mixture thereof with water, or any combination thereof.

In some embodiments, wherein the water clarification composition further comprises one or more of corrosion inhibitors. In some embodiments, wherein the water clarification composition further comprises one or more of corrosion inhibitors and a carrier. In some embodiments, the corrosion inhibitor is an imidazoline compound, a pyridinium compound, or a combination thereof.

In some embodiments, the water clarification composition further comprises an additional water clarification composition agent.

In some embodiments, the additional water clarification agent is another clarification agent. The additional clarification agent can be an inorganic coagulant. The inorganic coagulant includes, but is not limited to, aluminum sulfate, aluminum chloride, ferric sulfate and ferric chloride. In some embodiments, from about 200 to about 500 ppm of the inorganic coagulant can be added to the water system.

In some embodiments, the additional coagulant/flocculant agent is another polymeric cationic, anionic, nonionic, or inorganic coagulant/flocculant agent. In some embodiments, the additional coagulant/flocculant has an average molecular weight ($M_w$) of from about 100,000 Da to about 2,000,000 Da. In some embodiments, the additional coagulant/flocculant has an average molecular weight ($M_w$) of from about 1,000 Da to about 100,000 Da. In some embodiments, the additional coagulant/flocculant has an average molecular weight ($M_w$) of from 100,000 to 2,000,000 Da. In some embodiments, the additional coagulant/flocculant has an average molecular weight ($M_w$) of from 2,000 to 1,000,000 Da. In some embodiments, the additional coagulant/flocculant has an average molecular weight ($M_w$) of from 5,000 to 2,000,000 Da. In some embodiments, the additional coagulant/flocculant agent has an average molecular weight ($M_w$) of from 10,000 to 100,000 Da.

In some embodiments, the additional cationic coagulant/flocculant has net charges of from 10 to 1,000. In some other embodiments, the addition anionic coagulant/flocculant agent has net charges of from 10 to 1,000.

In some embodiments, the additional water clarification agents include condensation polymers as well as polymers derived from vinyl monomers. Vinyl polymers having water solubility and cationic characteristics include modified polyacrylamides, modification being made, for example, by the typical Mannich reaction products or the quaternized Mannich reaction products, or other vinylic polymers that use as a vinyl monomer those monomers containing cationic groups. Representative vinyl monomers include allylamine, dimethylaminoethylmethacrylate, dimethylaminoethylmethacrylate quatermized with dimethyl Sulfate, diallylcyclohexylamine hydrochloride, diallyl dimethyl ammonium chloride, dimethyl aminoethyl acrylate and/or its acid salts, ethacrylamidopropyl trimethyl ammonium chloride, 1-acrylamido-4-methyl piperazine (quaternized with MeCl, MeBr, or dimethyl Sulfate), diethylaminoethyl acrylate and/or its acid Salts, diethylaminoethyl methacrylate and/or its acid salts, dimethylaminoethyl acrylamide and/or its acid salts, dimethylaminoethyl methacrylamide and/or its acid salts, diethyl aminoethyl acrylamide and/or its acid salts, diethyl aminoethyl methacrylamide and/or its acid Salts, and the like, and mixtures thereof. These cationic coagulants preferably have a molecular weight of from about 2,000 to greater than about 1,000,000.

In some other embodiments, the additional water clarification agents include cationic coagulants comprising polydiallyl dimethyl ammonium chloride and one or more anionic monomers that are disclosed in U.S. Pat. Nos. 4,715,962, 5,013,456 and 5,207,924, which are incorporated herein by reference.

In some other embodiments, the additional water clarification agents include cationic coagulants comprising dimethyl ammonium chloride and Vinyltrialkoxysilane monomer units that are disclosed in U.S. Pat. No. 5,589,075, which are incorporated herein by reference.

In yet some other embodiments, the additional water clarification agents include low molecular weight cationic coagulants, which can be epichlorohydrin-dimethylamine and polydiallyldimethy lammonium chloride that are disclosed in U.S. Pat. No. 4,655,934, which is incorporated herein by reference.

In some embodiments, from about 1 ppm to about 50 ppm of the additional water clarification agent is added to the water system.

In some embodiments, the water clarification composition further comprises a biocide. In some embodiments, the water clarification composition further comprises a biocide and carrier. In some other embodiments, the water clarification composition further comprises a biocide, corrosion inhibitor, and carrier.

In some other embodiments, the biocide is chlorine, hypochlorite, $ClO_2$, bromine, ozone, hydrogen peroxide, peracetic acid, peroxycarboxylic acid, peroxycarboxylic acid composition, peroxysulphate, glutaraldehyde, dibromonitrilopropionamide, isothiazolone, terbutylazine, polymeric biguanide, methylene bisthiocyanate, tetrakis hydroxymethyl phosphonium sulphate, and any combination thereof.

In some embodiments, the water clarification composition further comprises an organic sulfur compound. In some other embodiments, wherein the organic sulfur compound is a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof.

In some embodiments, the water clarification composition further comprises an acid. In some embodiments, the water clarification composition further comprises an inorganic acid, mineral acid, organic acid, or mixture thereof. In some embodiments, the water clarification composition comprises from about 1 wt-% to about 20 wt-% of the acid.

In some embodiments, the acid is hydrochloric acid, hydrofluoric acid, citric acid, formic acid, acetic acid, or mixture thereof.

In some embodiments, the water clarification composition further comprises a hydrogen sulfide scavenger. In some other embodiments, the hydrogen sulfide scavenger is an oxidant, inorganic peroxide, sodium peroxide, chlorine dioxide; a $C_1$-$C_{10}$ aldehyde, formaldehyde, glyoxal, glutaraldehyde, acrolein, or methacrolein, a triazine, monoethanolamine triazine, monomethylamine triazine, or a mixture thereof.

In some embodiments, the water clarification composition further comprises a surfactant. In some embodiments, the water clarification composition further comprises a surfactant, biocide, and carrier.

In some embodiments, the surfactant is a nonionic, semi-nonionic, cationic, anionic, amphoteric, zwitterionic, Gemini, di-cationic, di-anionic surfactant, or mixtures thereof.

In some embodiments, the surfactant is an alkyl phenol, fatty acid, or mixture thereof.

In some embodiments, the water clarification composition further comprises an asphaltene inhibitor, a paraffin inhibitor, a scale inhibitor, a gas hydrate inhibitor, a pH modifier, or any combination thereof.

In some embodiments, the water clarification composition further comprises an emulsion breaker, reverse emulsion breaker, coagulant/flocculant agent, an emulsifier, a water clarifier, a dispersant, antioxidant, polymer degradation prevention agent, permeability modifier, foaming agent, antifoaming agent, emulsifying agent, scavenger agent for $CO_2$, and/or $O_2$, gelling agent, lubricant, friction reducing agent, salt, or mixture thereof.

In some embodiments, the water clarification composition is a liquid, gel, or a mixture comprising liquid/gel and solid.

In some embodiments, the water clarification composition or a use solution thereof has a pH of from about 2 to about 11.

In some embodiments, the water clarification composition comprises from about 20 wt-% to about 60 wt-% of the compound or mixture thereof.

In some embodiments, the compound, or modified compound, or mixture thereof has a concentration of from about 1 ppm to about 1000 ppm in the treated water system or waste water source.

In some embodiments, the water clarification composition is provided to the water system independently, simultaneously, or sequentially with an additional water clarification composition agent.

In some embodiment, the water system is a waste water source from a factory, residential home, industrial processing, or like. In some embodiments, the waste water source comprises oil-in-water emulsion.

In some embodiments, the water system is an oily waste water source from food and beverage, steel, automotive, transportation, refinery, pharmaceutical, metals, paper and pulp, chemical processing, water system used in oil refinery industry, or hydrocarbon processing industries.

In some embodiments, the water system or waste water source comprises fresh water, recycled water, salt water, surface water, produced water, or mixture thereof. In some embodiments, the water system is a cooling water system or boiler water system.

In some other embodiments, the water system or waste water source is a one from petroleum wells, downhole formations, geothermal wells, mineral washing, flotation and benefaction, papermaking, gas scrubbers, air washers, continuous casting processes in the metallurgical industry, air conditioning and refrigeration, water reclamation, water purification, membrane filtration, food processing, clarifiers, municipal sewage treatment, municipal water treatment, or potable water system.

In other embodiments, the waste water source is an oily waste water from food and beverage process or water system used in oil refinery industry. In yet some other embodiments, the waste water source is an oily waste water in oil and gas operations.

In some embodiments, the water clarification composition or multiple charged cationic or anionic compounds disclosed herein can clarify a water system as indicated by a jar test described in the Examples section of this disclosure, when the water system or a waste water source has a multiple charged cationic or anionic compound, or mixture thereof concentration of from about 1 ppm to about 1,000 ppm, from about 1 ppm to about 900 ppm, from about 1 ppm to about 800 ppm, from about 1 ppm to about 700 ppm, from about 1 ppm to about 600 ppm, from about 1 ppm to about 500 ppm, from about 1 ppm to about 400 ppm, from about 1 ppm to about 300 ppm, from about 1 ppm to about 250 ppm, from about 1 ppm to about 200 ppm, from about 1 ppm to about 150 ppm, from about 1 ppm to about 100 ppm, from about 1 ppm to about 50 ppm, from about 1 ppm to about 25 ppm, from about 1 ppm to about 10 ppm, from about 0.5 ppm to about 2 ppm, about 950 ppm, about 850 ppm, about 750 ppm, about 650 ppm, about 550 ppm, about 450 ppm, about 350, about 250 ppm, about 150 ppm, about 50 ppm, about 25 ppm, about 10 ppm, about 5 ppm, about 2 ppm, about 1 ppm, about 0.5 ppm, or any value or range there between, after dosing the water system or the waste water source with the multiple charged cationic or anionic compound or mixture thereof, or the water clarification composition.

In some embodiments, the water clarification composition can further comprise a surfactant. The surfactant is a nonionic, semi-nonionic, anionic, cationic, amphoteric, zwitterionic, Gemini surfactant, or combinations thereof.

In some embodiments, the water clarification composition are solid compositions. In some other embodiments, the water clarification compositions are liquid.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%", "percent by weight", "% by weight", and variations thereof, as used herein, refer to the concentration of a substance as the weight of that substance divided by the total weight of the composition and multiplied by 100. It is understood that, as used here, "percent", "%", and the like are intended to be synonymous with "weight percent", "wt-%", etc.

The methods and compositions of the present disclosure may comprise, consist essentially of, or consist of the components and ingredients of the disclosed compositions or methods as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

EXAMPLES

Embodiments of the present disclosure are further defined in the following non-limiting Examples. These Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

Synthesis of Compound 1

(3-Acrylamidopropyl) trimethylammonium chloride (APTAC, 75%, 96 grams) and water (20 grams) were charged into a 250-mL three-necked RBF equipped with magnetic stir bar, temperature probe, and condenser. Tetraethylenepentamine (TEPA, 12 grams) was then added to the well-stirred reaction mixture at room temperature. Reaction temperature was raised to 80° C. and stirred overnight or until the >98% consumption of APTAC. The progression of reaction was monitored by ESI-MS and/or NMR spectroscopy for consumption of the monomer. The resulting aqueous solution of Compound 1 was used as-is for its application testing.

Example 2

Synthesis of Compound 2

Ethyleneamine E-100 from Huntsman was used for this reaction. E-100 is a mixture of tetraethylenepentamine (TEPA), pentaethylenehexamine (PEHA), hexaethyleneheptamine (HEHA), and other higher molecular weight amines.

E-100 is a complex mixture of various linear, cyclic, and branched amines with a number-average molecular weight ($M_n$) of 250-300 g/mole.

(3-Acrylamidopropyl) trimethylammonium chloride (AP-TAC, 75%, 60 grams) and water (20 grams) were charged into a 250-mL three-necked RBF equipped with magnetic stir bar, temperature probe, and condenser. Ethyleneamine E-100 (12 grams) was then added to the well-stirred reaction mixture at room temperature. Reaction temperature was raised to 80° C. and stirred overnight or until the >98% consumption of APTAC. The resulting aqueous solution of Compound 2 was used as-is for application testing.

Example 3

Synthesis of Compound 3

(3-Acrylamidopropyl) trimethylammonium chloride (AP-TAC, 75%, 70 grams) and water (20 grams) were charged into a 250-mL three-necked RBF equipped with magnetic stir bar, temperature probe, and condenser. Pentaethylenehexamine (PEHA, 10 grams, 99%) was then added to the well-stirred reaction mixture at room temperature. Reaction temperature was raised to 80° C. and stirred overnight or until the >98% consumption of APTAC. The resulting aqueous solution of Compound 3 was used as-is for application testing.

Example 4

Synthesis of Compound 4

BASF Lupasol® G20 (50% aqueous solution of polyethyleneimine with a weight-average molecular weight ($M_w$) around 1,300 g/mole) was used for this reaction.

(3-Acrylamidopropyl) trimethylammonium chloride (AP-TAC, 75%, 78.55 grams) was charged into a 250-mL three-necked RBF equipped with magnetic stir bar, temperature probe, and condenser. Lupasol G20 (50%, 50 grams) was then added to the well-stirred reaction mixture at room temperature. Reaction temperature was raised to 80° C. and stirred overnight or until the >98% consumption of APTAC. The resulting aqueous solution of Compound 4 was used as-is for application testing.

Example 5

Synthesis of Compound 5

BASF Lupasol® G100 (50% aqueous solution of a polyethyleneimine with a weight-average molecular weight ($M_w$) around 5000 g/mole) was used for this reaction.

(3-Acrylamidopropyl) trimethylammonium chloride (AP-TAC, 75%, 72.4 grams) was charged into a 250-mL three-necked RBF equipped with magnetic stir bar, temperature probe, and condenser. Lupasol G100 (50%, 50 grams) was then added to the well-stirred reaction mixture at room temperature. Reaction temperature was raised to 80° C. and stirred overnight or until the >98% consumption of APTAC. The resulting aqueous solution of Compound 5 was used as-is for application testing.

Example 6

Synthesis of Compound 6

(3-Acrylamidopropyl) trimethylammonium chloride (AP-TAC, 75%, 130 grams) and water (20 grams) were charged into a 250-mL three-necked RBF equipped with magnetic stir bar, temperature probe, and condenser. Diethylenetriamine (DETA, 10 grams) was then added to the well-stirred reaction mixture at room temperature. Reaction temperature was raised to 80° C. and stirred overnight or until the >98% consumption of APTAC. Reaction temperature was raised to 80° C. and stirred overnight or until the >98% consumption of APTAC. The resulting aqueous solution of Compound 6 was used as-is for application testing.

Example 7

Synthesis of Compound 7

BASF Lupasol® PS (33% aqueous solution of a polyethyleneimine with a weight-average molecular weight ($M_w$) around 750,000 g/mole) was used for this reaction.

(3-Acrylamidopropyl) trimethylammonium chloride (AP-TAC, 75%, 250 grams) and water (80 grams) were charged into a 500-mL three-necked RBF equipped with magnetic stir bar, temperature probe, and condenser. Lupasol G100 (50%, 50 grams) was then added to the well-stirred reaction mixture at room temperature. Reaction temperature was raised to 85° C. and stirred overnight or until the >98% consumption of APTAC. The resulting aqueous solution of Compound 7 was used as-is for application testing.

Example 8

Synthesis of Compound 8

Polyethylenimine, branched (from Sigma Aldrich, with a weight-average molecular weight ($M_w$) around 25,000 g/mole) was used for this reaction.

(3-Acrylamidopropyl) trimethylammonium chloride (AP-TAC, 75%, 100 grams) and water (15 grams) were charged into a 500-mL three-necked RBF equipped with magnetic stir bar, temperature probe, and condenser. Polyethylenimine (100 grams) was then added to the well-stirred reaction mixture at room temperature. Reaction temperature was raised to 85° C. and stirred overnight or until the >98% consumption of APTAC. The resulting aqueous solution of Compound 8 was used as-is for application testing.

Example 9

Using Exemplary Multiple Charged Cationic Compounds for Water Clarification

In this Example, various exemplary multiple charged cationic compounds were tested for clarifying three exemplary waste water systems, a synthetic water oily water mixture and two waste water systems collected from two different oil refinery facilities, and compared with an incumbent compound for their water clarification effectiveness.

Fluids can contain suspended solid matter consisting of particles of many varied sizes. While some suspended material will be large enough and heavy enough to settle rapidly to the bottom of the container if a liquid sample is left to stand (the settable solids), very small particles will settle only very slowly or not at all if the sample is regularly agitated or the particles are colloidal. These small solid particles cause the liquid to appear turbid.

Turbidity is the cloudiness or haziness of a fluid caused by large numbers of individual particles that are generally invisible to the naked eye, like smoke in air. The measurement of turbidity is a key test of water quality.

The propensity of particles to scatter a light beam focused on them is now considered a more meaningful measure of turbidity in water. Turbidity measured this way uses an instrument called a nephelometer with the detector set up to the side of the light beam. More light reaches the detector if there are lots of small particles scattering the source beam than if there are few. The units of turbidity from a calibrated nephelometer are called Nephelometric Turbidity Units (NTU). To some extent, how much light reflects for a given number of particulates is dependent upon properties of the particles like their shape, color, and reflectivity. For this reason (and the reason that heavier particles settle quickly and do not contribute to a turbidity reading), a correlation between turbidity and total suspended solids (TSS) is somewhat unusual for each location or situation.

The synthetic oily water solution used in this Example was prepared as described in the following manner:

a) Take 10 L of a cold tap water in a bucket and adjust the pH to 5.0 with sulfuric acid.
b) Add 3 mL ppm oleic acid into the cold tap water for a proximately 300 ppm oil in water mixture and emulsify the mixture at 10,000 RPM for 2 mins.
c) Add about 3 mL triglyceride into the mixture for a proximately 300 ppm triglyceride solution and emulsify the mixture at 10,000 RPM for 2 mins.
d) Adjust the final pH of the solution to 8 with a caustic agent.

To determine the effectiveness of a water clarification composition agent at improving clarity of an oily waste water, a so-called jar test was performed as described below.

a) 200 mL aliquots of the synthetic aqueous solution prepared as described above were transferred to beakers (jars).
b) Each jar was spiked with different dosages of a test clarification agent, so the agent concentration in each jar was 10, 15, 25, 35, 50 and 60 ppm, respectively.
c) The mixture in each jar was mixed by a mixer for 1 min at 250 rpm and then for 2 min at 50 rpm.
d) Turbidities of the supernatant are recorded using Hach 2100Q portable turbidimeter, after 20 mins of settling.

Table 2 lists the structures of the exemplary multiple charged cationic compounds and the incumbent compound. Table 3 shows the list of names and structures for the existing common clarification agents, which were also tested for water clarification for comparison purposes.

Figure 3:
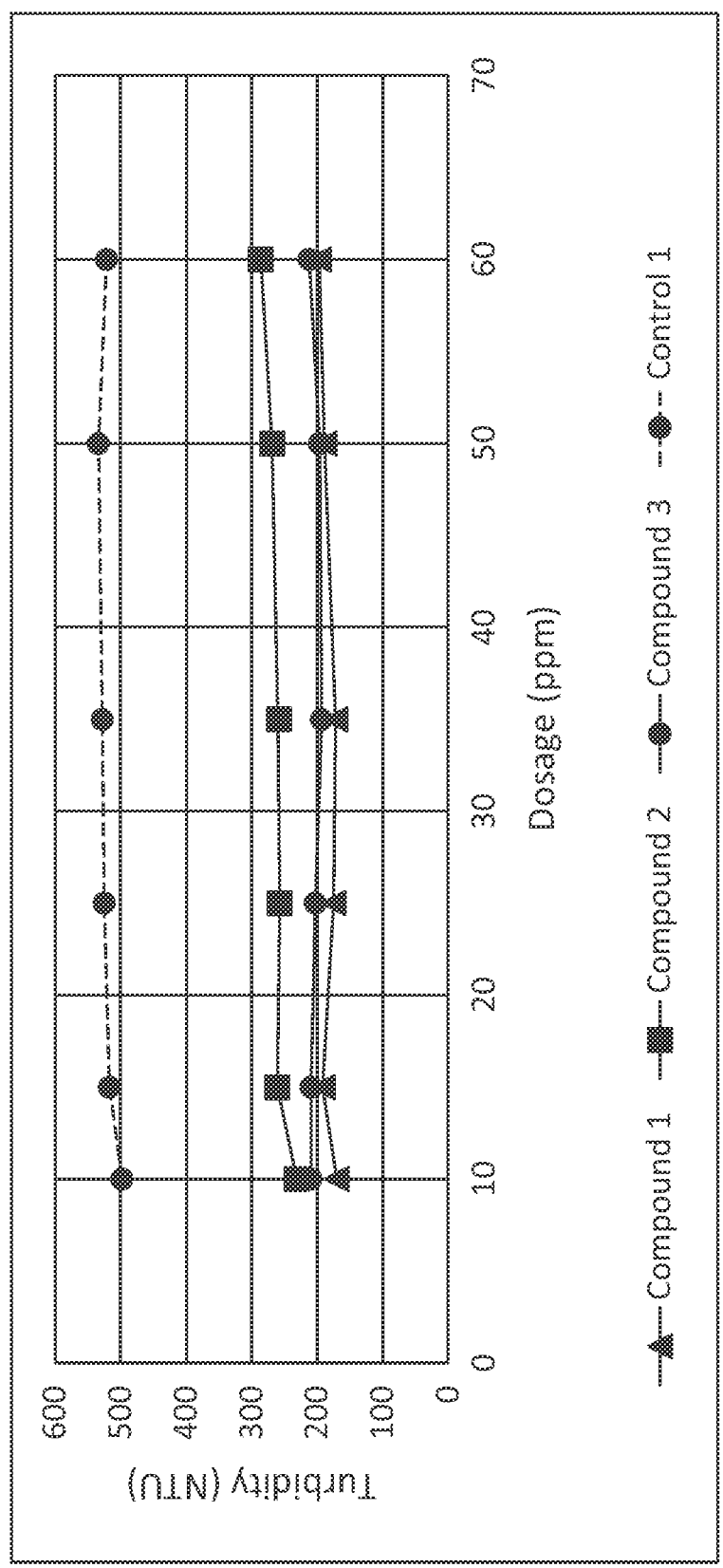
FIG. 3 shows the results of using several exemplary multiple charged cationic compounds and one incumbent compound to treat a synthetic oily water system.

Table 4 lists and FIG. 3 shows the results of the Jar Tests for three exemplary multiple charged cationic compounds and one incumbent compound to clarify a synthetic oily water mixture as prepared above. The results in Table 4 shows superior water clarity results as indicated by lower turbidity values were obtained with the exemplary multiple charged cationic compounds disclosed herein compared to the inline chemistry Control 1, a compound current used for water clarification.

TABLE 2

List of the structures for the tested clarification agent

| Multiple Charged Cationic Compound ID | Product Chemistry: Polyamine-APTAC adduct | |
|---|---|---|
| | Polyamine | activated olefin |
| 1 | Tetraethylenepentamine (TEPA) | APTAC |
| 2 | Ethyleneamine E-100 | APTAC |
| 3 | Pentaethylenehexamine (PEHA) | APTAC |
| 4 | Lupasol ® G20 | APTAC |
| 5 | Lupasol ® G100 | APTAC |
| 6 | Diethylenetriamine (DETA) | APTAC |
| 7 | Lupasol ® PS | APTAC |
| 8 | Polyethylenimine, Mw = 25K Daltons | APTAC |

TABLE 3

List of the names and structures for the existing common clarification agents
Commercial Product Tested

| Control Compound No. | Chemistry |
|---|---|
| 1 | Control 1 | Poly(Diallyl-dimethyl-ammonium chloride) |
| 3 | Control 2 | Dimethylamine-Epichlorohydrin copolymer |

TABLE 4

Results of the Jar Tests for three exemplary multiple charged cationic compounds and one incumbent compound

| | Turbidity (NTU) at different dosages Dosage in ppm and Turbidity (NTU) | | | | | | |
|---|---|---|---|---|---|---|---|
| Compound ID | 0 | 10 | 15 | 25 | 35 | 50 | 60 |
| No. 1 | 1000 | 170 | 192 | 175 | 172 | 189 | 197 |
| No. 2 | 1000 | 231 | 261 | 257 | 260 | 269 | 286 |
| No. 3 | 1000 | 209 | 209 | 203 | 193 | 196 | 212 |
| Control 1 | 1000 | 498 | 517 | 525 | 528 | 534 | 522 |

The data in Table 4 and FIG. 3 also show that exemplary multiple charged cationic compounds disclosed herein follow a similar dose response pattern as one for the widely used 8108+. The data in Table 4 and FIG. 3 indicates that the concentration of from above 0 ppm to about 60 ppm of the clarification agent is a clearly an optimum range, above which the enhanced performance is not achieved with increase in concentration.

For example, treatment of the oily solution with 10 ppm of the 8108+ reduced its turbidity from 1000 NTU to 498 NTU, whereas 10 ppm of Compound 1 reduced the turbidity of the same oily solution from 1000 NTU to 170 NTU. This data suggests that a significantly lower treatment dosage of the multiple charged cationic compounds disclosed herein can be used effectively for oily water clarification.

Table 5 shows the results after some exemplary cationic compounds and one incumbent compound was applied to a waste water system from an oil refinery facility.

TABLE 5

Results of the Jar Tests for several exemplary multiple charged cationic compounds and two incumbent compounds

| Compound ID | Turbidity (NTU) at Various Concentration (ppm) | | |
| --- | --- | --- | --- |
| | 50 ppm | 100 ppm | 150 ppm |
| Control 1 | 20.3 | 19.6 | 18.4 |
| Control 2 | 14.7 | 14.9 | 14.9 |
| No. 1 | 12.4 | 11.8 | 11.9 |
| No. 2 | 13.6 | 12.1 | 12.8 |
| No. 6 | 11.9 | 11.9 | 12.0 |
| No. 3 | 14.1 | 13.4 | 12.6 |
| No. 5 | 13.8 | 12.4 | 13.3 |

The results in Table 5 shows that the performance differences between the exemplary compounds and the incumbent compounds were not significant for this specific waste water system. However, the exemplary compounds are still better than the incumbent compounds.

Figure 4:
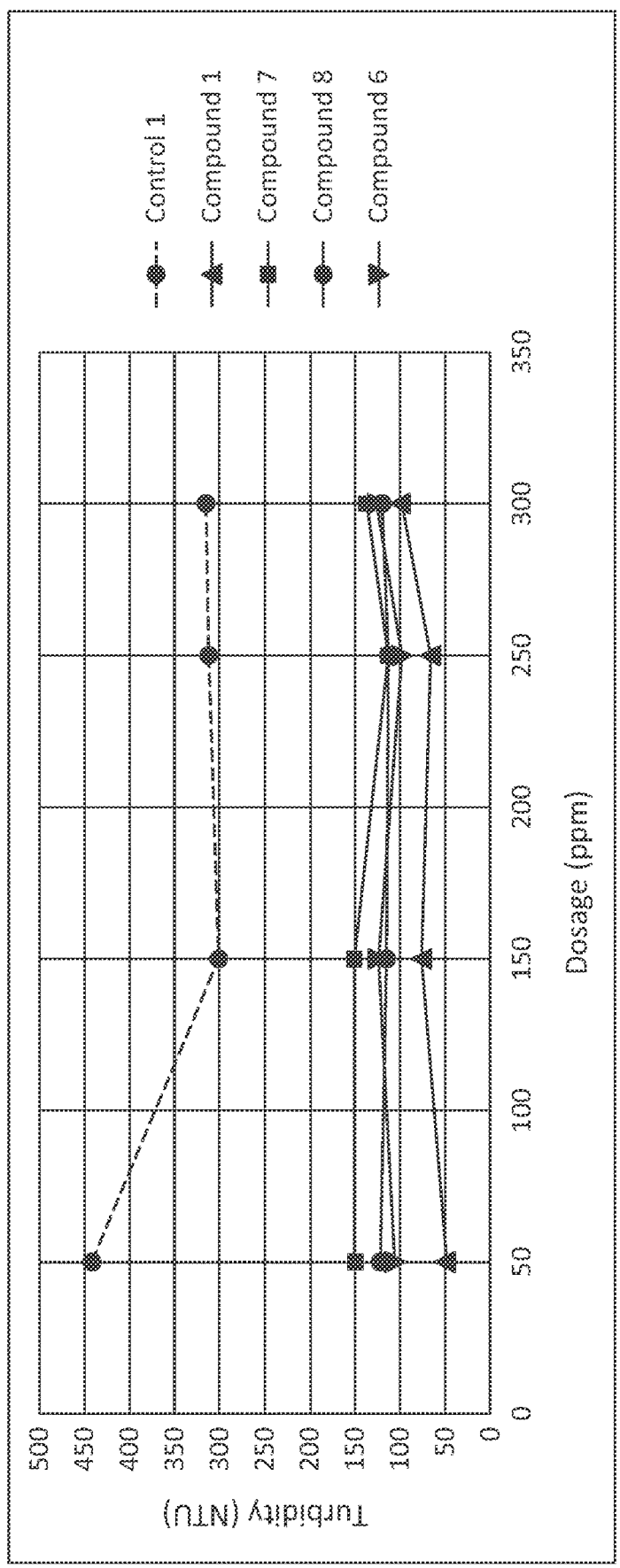
FIG. 4 shows the results of using several exemplary multiple charged cationic compounds and one incumbent compound to treat a waste water system from an oil refinery facility.

Some exemplary compounds and one incumbent compound were tested for clarify another waste water system from another refinery facility. Table 6 and FIG. 4 shows the results of the tests.

TABLE 6

Results of the Jar Tests for several exemplary multiple charged cationic compounds and two incumbent compounds

| Compound ID | Turbidity (NTU) at Various Concentration (ppm) | | | |
| --- | --- | --- | --- | --- |
| | 50 | 150 | 250 | 300 |
| No. 1 | 48.2 | 76 | 65.9 | 97.9 |
| No. 7 | 151 | 151 | 113 | 137 |
| No. 8 | 122 | 115 | 113 | 120 |
| No. 6 | 106 | 124 | 97.9 | 126 |
| Control 1 | 442 | 301 | 312 | 315 |

The results in Table 6 shows that the performance of the exemplary compounds performance much better results than the incumbent compound, Control 1, for the waste water system from this specific water system. FIG. 4 shows the results of these tests as well. The results in FIG. 4 show that the clarification profile for the exemplary compounds are also different from the incumbent compound and that the exemplary compounds can achieve the turbidity reduction with a lower concentration of the compounds. Increasing the concentration of the exemplary compounds would not enhance their performances, in contrast to the incumbent compound in the concentration range of from above 0 ppm to about 100 ppm.

Example 10

Synthesis of Compound 9

(3-Acrylamidopropyl) trimethylammonium chloride (APTAC, 75%, 100 grams) and water (20 grams) were charged into a 250-mL three-necked RBF equipped with magnetic stir bar, temperature probe, and condenser. Triethylenetetramine (TETA, 60%, 15 grams) was then added to the well-stirred reaction mixture at room temperature. Reaction temperature was raised to 80° C. and stirred overnight or until the >98% consumption of APTAC. The resulting aqueous solution of Compound 9 was used as-is for its application testing.

Example 11

Using Exemplary Multiple Charged Cationic Compounds for Water Clarification and Turbidity Reduction in Oil and Gas Applications In this Example, additional exemplary multiple charged cationic compounds were tested according to ajar test procedure set forth in Example 9 (modifications described herein). All chemicals were dosed as 1% solutions and the oily water solution used in this Example was obtained from the field—produced water from a deoiled water tank. The untreated water had a turbidity of 398 NTU.

To determine the effectiveness of a water clarification composition agent at improving clarity of an oily waste water, the jar test was performed as described below.

a) 200 mL aliquots of the produced water was transferred to beakers (jars).
b) Each jar was spiked with different dosages of a test clarification agent (i.e. coagulant), so the agent concentration in each jar was 25, 50, 75, 100, 125 and 150 ppm, respectively.
c) The mixture in each jar was mixed by a mixer for 1 min at 200 rpm and then for 5 min at 25 rpm.
d) Turbidities of the supernatant are recorded using Hach 2100Q portable turbidimeter, after 20 mins of settling.

Table 7 lists the structures of the exemplary multiple charged cationic compounds and the incumbent compound evaluated in this Example. The Compound 9 was added compared to other Compounds and Control 2 as shown in Table 7.

TABLE 7

List of the structures for the tested clarification agent

| Multiple Charged Cationic Compound ID | Product Chemistry: Polyamine-APTAC adduct | |
| --- | --- | --- |
| | Polyamine | activated olefin |
| 1 | Tetraethylenepentamine (TEPA) | APTAC |
| 3 | Pentaethylenehexamine (PEHA) | APTAC |
| 4 | Lupasol ® G20 | APTAC |
| 5 | Lupasol ® G100 | APTAC |
| 9 | Triethylenetetramine (TETA) | APTAC |
| Control 2 | Dimethylamine-Epichlorohydrin copolymer | |

TABLE 8

Results of the Jar Tests for exemplary multiple charged cationic compounds and one incumbent compound (Control)

| | Turbidity (NTU) at different dosages Dosage in ppm and Turbidity (NTU) | | | | | |
|---|---|---|---|---|---|---|
| Compound ID | 25 | 50 | 75 | 100 | 125 | 150 |
| Control 2 | 414 | 417 | 123 | 25 | 9 | 9 |
| 1 | 26 | 26 | 22 | 20 | 22 | 24 |
| 9 | 32 | 25 | 24 | 23 | 32 | 26 |
| 4 | 119 | 25 | 23 | 20 | 25 | 22 |
| 3 | 29 | 22 | 22 | 20 | 20 | 20 |
| 5 | 405 | 61 | 23 | 16 | 16 | 20 |

The results of Table 8 suggest the following dosages are needed to clarify the evaluated produced water, as shown in Table 9.

TABLE 9

Exemplary dosages

| Chemical | % Actives | Product dose | Actives dose |
|---|---|---|---|
| 8105 (Control) | 55 | 100 | 55 |
| 1 | 82 | 25 | 20 |
| 3 | 83 | 25 | 20 |
| 9 | 83 | 25 | 20 |
| 4 | 67 | 50 | 38 |
| 5 | 68 | 75 | 51 |

The results demonstrate a beneficial reduction in dosage for the multiple charged cationic compounds compared to the Control, as shown in Table 10.

TABLE 10

Exemplary dosage reductions compared to Control

| Chemical | Dose reduction (%) |
|---|---|
| 1 | 54 |
| 3 | 54 |
| 9 | 54 |
| 4 | 31 |
| 5 | 7 |

The above specification provides a description of the water clarification compositions and methods of using the water clarification compositions for water clarification in a water system. It will be obvious that the same may be varied in many ways. Such variations are not to be regarded as a departure from the spirit and scope of the disclosures and all such modifications are intended to be included within the scope of the following claims.

What is claimed is:

1. A water clarification composition comprising:
a compound or its salt and one or more water clarification composition agents, wherein the compound is derived from an aza-Michael Addition Reaction between a polyamine and an activated olefin having an ionic group according to the following formula

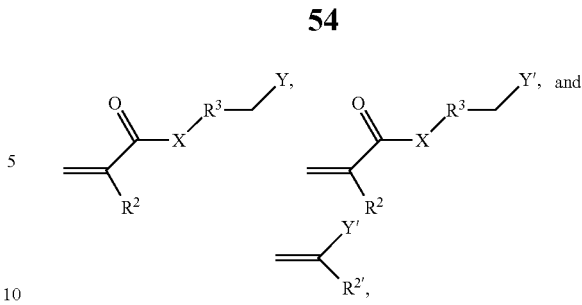

wherein:
X is NH or O;
$R^2$ is H, $CH_3$, or an unsubstituted, linear or branched $C_2$-$C_{10}$ alkyl, alkenyl, or alkynyl group;
$R^{2'}$ is H, $CH_3$, or an unsubstituted or substituted, linear or branched $C_1$-$C_{10}$ alkyl, alkenyl, alkynyl group, —COOH, —$CH_2$COOH, Y', or —$(CH_2)_m$—Y'; m is an integer of 2 to 4;
$R^3$ is absent or an unsubstituted, linear or branched $C_1$-$C_{30}$ alkylene group;
Y is —$NR_4R_5R_6^{(+)}$;
Y' is —COOH, —$SO_3H$, —$PO_3H$, —$OSO_3H$, —$OPO_3H$, or a salt thereof; and
$R^4$, $R^5$, and $R^6$ are independently a $C_1$-$C_{10}$ alkyl group;
wherein the compound is a multiple charged cationic compound having 2 or more positive charges or anionic compound having 2 or more negative charges and wherein the water clarification composition reduces turbidity of the water system.

2. The composition according to claim 1, wherein the polyamine is a linear, branched, or dendrimer polyamine with a general formula of $NH_2$—$[R^{10'}]_n$—$NH_2$, $(RNH)_n$—$RNH_2$, $H_2N$—$(RNH)_n$—$RNH_2$, or $H_2N$—$(RN(R'))_n$—$RNH_2$, wherein $R^{10'}$ is a linear or branched, unsubstituted or substituted $C_2$-$C_{10}$ alkylene group, or combination thereof; R is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkylene group, or combination thereof; R' is —$CH_2$—, —$CH_2CH_2$—, —$CH_2CH_2CH_2$—, —$CH(CH_3)CH_2$—, a linear or branched, unsubstituted or substituted $C_4$-$C_{10}$ alkyl group, $RNH_2$, $RNHRNH_2$, or $RN(RNH_2)_2$; and n can be from 2 to 1,000,000.

3. The composition according to claim 1, wherein the polyamine is an unmodified polyamine, and/or wherein the polyamine is a linear, branched, or dendrimer polyethyleneimine.

4. The composition according to claim 3, wherein the polyamine comprises: only primary and secondary amine groups; only primary, secondary, and tertiary amine groups; or only primary and tertiary amine groups.

5. The composition according to claim 1, wherein the polyamine has an average molecular weight ($M_w$) of from about 60 to about 2,000,000 Da, or from about 60 to about 5,000 Da.

6. The composition according to claim 1, wherein the polyamine is a diamine or a triamine having an average molecular weight ($M_w$) of from about 60 to about 1,300.

7. The composition according to claim 1, wherein the compound is of single molecule, a mixture of at least two multiple charged cationic compounds, a mixture of at least two multiple charged cationic derived from the same polyamine and the activated olefin having a cationic group, a mixture of at least two multiple charged anionic compounds, a mixture of at least two multiple charged anionic compounds derived from the same polyamine and the activated olefin having an anionic group, a mixture of at least two multiple charged cationic or anionic compounds derived from different polyamines and the same activated olefin, or a mixture of at least two multiple charged cationic or anionic compounds derived from different polyamines and different activated olefins.

8. The composition according to claim 1, wherein the compound has an average molecular weight ($M_w$) of from about 100 to about 2,000,000 Da, and is soluble in water.

9. The composition to claim 1, wherein X is NH or O; $R^2$ is H or $CH_3$; Y is $-NR_4R_5R_6^{(+)}$, Y is $-NR^4R^5R^{6(+)}$ and $R^4$, $R^5$, and $R^6$ are independently $CH_3$, Y is $-NR^4R^5R^{6(+)}$ and $R^4$ and $R^5$ are independently $CH_3$, and $R^6$ is a $C_6$-$C_{12}$ aromatic alkyl, Y is $-NR^4R^5R^{6(+)}$ and $R^4$ and $R^5$ are independently $CH_3$, and $R^6$ is $-CH_2-C_6H_6$, or Y is $-NR^4R^5R^{6(+)}$ and the counter ion for Y is chloride, bromide, fluoride, iodide, acetate, aluminate, cyanate, cyanide, dihydrogen phosphate, dihydrogen phosphite, formate, hydrogen carbonate, hydrogen oxalate, hydrogen sulfate, hydroxide, nitrate, nitrite, thiocyanate, or a combination thereof; Y' is $-COOH$ or salt thereof, $-SO_3H$ or salt thereof, or $-POSH$ or salt thereof; and $R^3$ is $CH_2$, $-CH_2CH_2-$, $-CH_2CH_2CH_2-$ or $-C(CH_3)_2-$, an unsubstituted, linear, and saturated $C_1$-$C_{20}$ alkylene group, an unsubstituted, linear, and unsaturated $C_1$-$C_{20}$ alkylene group, a linear $C_8$-$C_{18}$ alkyl, alkenyl, or alkynyl group, or a branched $C_8$-$C_{20}$ alkyl, alkenyl, or alkynyl group.

10. The composition according to claim 1, wherein the activated olefin is (3-Acrylamidopropyl)trimethylammonium chloride (APTAC), [3-(Methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), or 2-(methacryloyloxy)-N,N,N-trimethylethan-1-aminium methyl sulfate (DMAEA-MSQ).

11. The composition according to claim 1, wherein the activated olefin is an acrylic acid, methacrylic acid, 2-acrylamido-2-methylpropane sulfonic acid (AMPS), itaconic acid, maleic acid, 3-(allyloxy)-2-hydroxypropane-1-sulfonate, vinylsulfonic acid, vinylphosphonic acid, or mixture thereof.

12. The composition according to claim 1, wherein the multiple charged cationic or anionic compound is the product mixture of: a linear polyethyleneimine and (3-Acrylamidopropyl)trimethylammonium chloride (APTAC) or [3-(Methacryloylamino)propyl]trimethylammonium chloride (MAPTAC); or a branched polyethyleneimine and (3-Acrylamidopropyl)trimethylammonium chloride (APTAC) or [3-(Methacryloylamino)propyl]trimethylammonium chloride (MAPTAC).

13. The composition according to claim 1, wherein the compound is

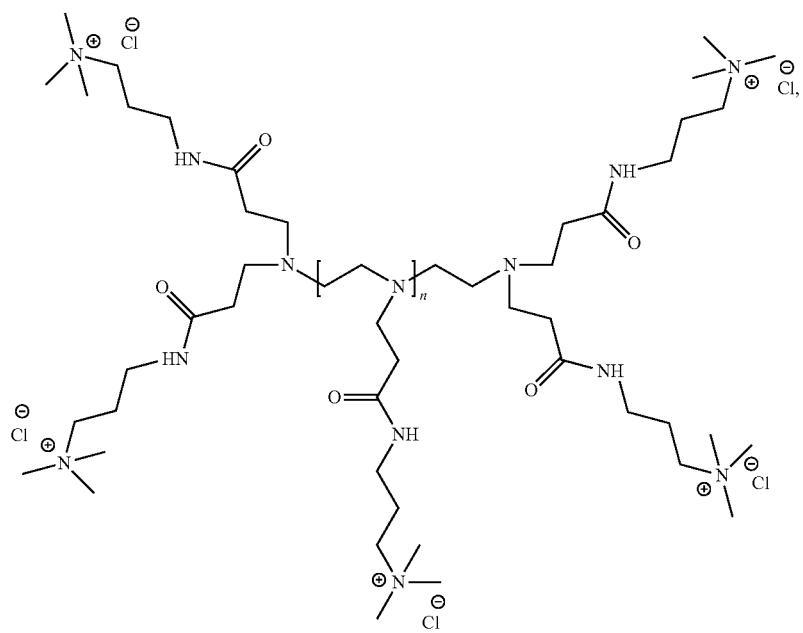

wherein n=0-1000;
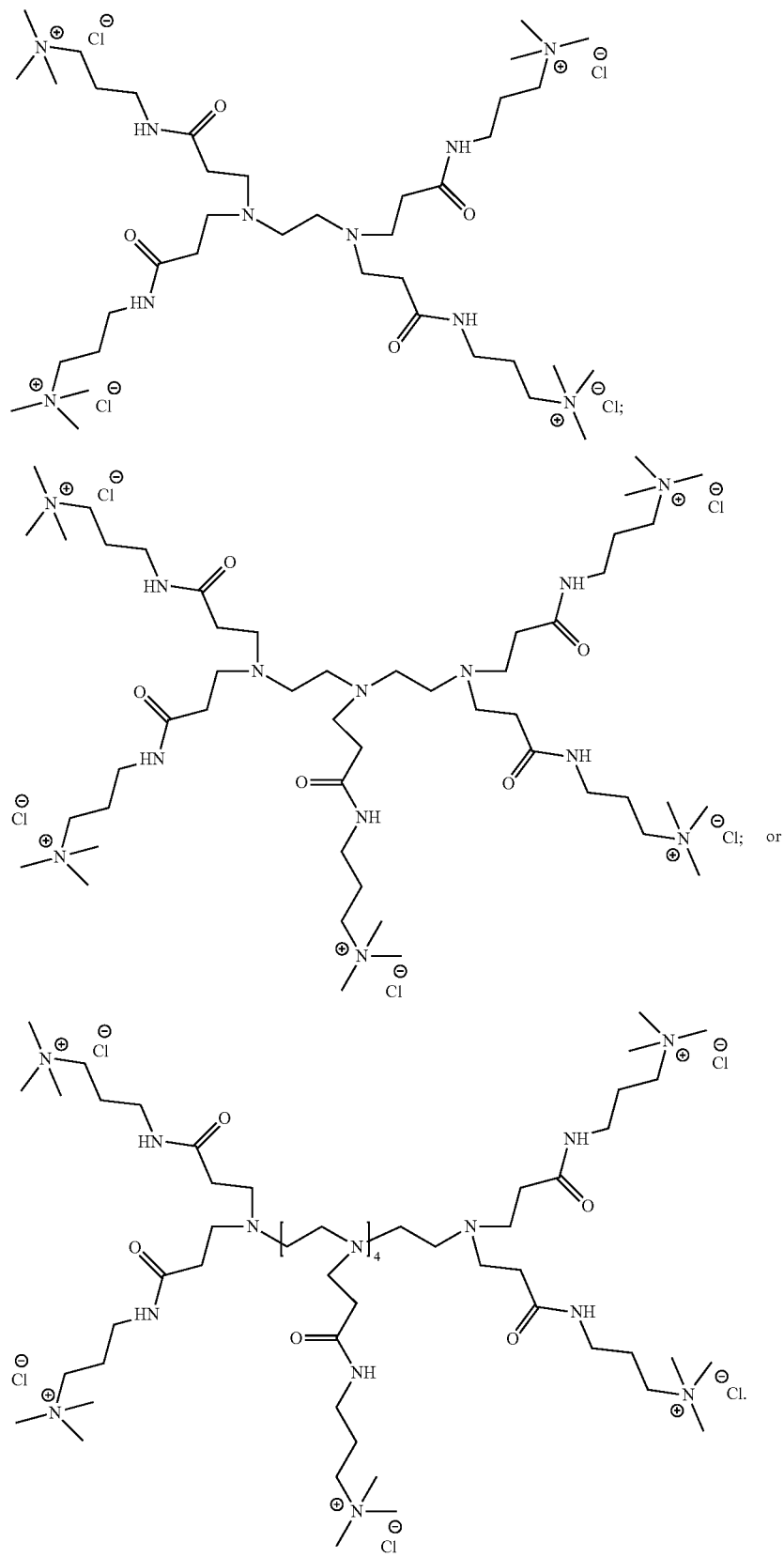

14. The composition according to claim 1, wherein the compound is derived from: a polyethyleneimine and (3-Acrylamidopropyl)trimethylammonium chloride (APTAC), wherein the polyethyleneimine is a linear PEI and has an average molecular weight ($M_w$) of about 5,000; a polyethyleneimine and (3-Acrylamidopropyl)trimethylammonium chloride (APTAC), wherein the polyethyleneimine is a linear PEI and has an average molecular weight ($M_w$) of about 750,000; a polyethyleneimine and (3-Acrylamidopropyl)trimethylammonium chloride (APTAC), wherein the polyethyleneimine is a branched PEI and has an average molecular weight ($M_w$) of about 25,000; or a diethylentriamine and (3-Acrylamidopropyl)trimethylammonium chloride (APTAC).

15. The composition according to claim 1, further comprising a carrier that is water, an alcohol, an alkylene glycol, an alkyleneglycol alkyl ether, or a combination thereof.

16. The composition according to claim 1, comprising from about 0.1 wt-% to about 90 wt-% of the multiple charged cationic or anionic compound or its salt, and wherein the composition further comprises one or more additional water clarification composition agents comprising a surfactant, acid, alkalinity source, additional coagulant/flocculant agent, biocide, or mixture thereof.

17. The composition according to claim 16, wherein the additional coagulant/flocculant agent is a polymeric cationic, anionic, nonionic, or inorganic coagulant/flocculant agent.

18. The composition according to claim 17, wherein the additional coagulant/flocculant agent is aluminum sulfate, aluminum chloride, ferric sulfate, ferric chloride, a mixture thereof.

19. The composition according to claim 17, wherein the additional coagulant/flocculant agent is: a high molecular weight polymeric nonionic, anionic or cationic coagulant/flocculant agent and wherein the high molecular weight polymeric cationic coagulant/flocculant agent has an average molecular weight ($M_w$) of from 100,000 to 2,000,000 Da, and wherein the high molecular weight polymeric cationic coagulant/flocculant agent has net charges of from 10 to 1,000; or is a low molecular weight polymeric nonionic, anionic or cationic coagulant/flocculant agent and wherein the low molecular weight polymeric cationic coagulant/flocculant agent has an average molecular weight ($M_w$) of from 10,000 to 100,000 Da, and wherein the low molecular weight polymeric cationic coagulant/flocculant agent has net charges of from 10 to 1,000.

* * * * *

UNITED STATES PATENT AND TRADEMARK OFFICE
CERTIFICATE OF CORRECTION

Page 1 of 2

PATENT NO. : 11,926,543 B2
APPLICATION NO. : 17/652728
DATED : March 12, 2024
INVENTOR(S) : Dhawan et al.

It is certified that error appears in the above-identified patent and that said Letters Patent is hereby corrected as shown below:

On the Title Page

Item (56), Other Publications, Column 2, Line 1:
Delete "Suga® Quat,"
Insert --Suga®Quat,--

In the Specification

Column 1, Line 9:
Insert --Application-- after "U.S."

Column 1, Line 21:
Delete "OPERERATIONS"
Insert --OPERATIONS--

In the Claims

Column 55, Claim 9, Line 17:
Insert --according-- after "composition"

Column 55, Claim 9, Line 18:
Delete "—NR$_4$R$_5$R$_6^{(+)}$," after "Y is"
Insert -- —NR$^4$R$^5$R$^{6(+)}$,-- after "Y is"

Column 55, Claim 9, Line 30:
Delete "—POSH"
Insert -- —PO$_3$H--

Column 59, Claim 14, Lines 12-13:
Delete "diethylentriamine" after "a"

Signed and Sealed this
Ninth Day of July, 2024

Katherine Kelly Vidal
*Director of the United States Patent and Trademark Office*

Insert --diethylenetriamine-- after "a"

Column 60, Claim 18, Lines 7-8:
Delete "a mixture thereof." after "ferric chloride,"
Insert --or a mixture thereof.-- after "ferric chloride,"